(12) United States Patent
Kim

(10) Patent No.: US 11,168,389 B2
(45) Date of Patent: Nov. 9, 2021

(54) PLATED STEEL SHEET HAVING FINE AND EVEN PLATING STRUCTURE

(71) Applicant: POSCO, Pohang-si (KR)

(72) Inventor: Su Young Kim, Pohang-si (KR)

(73) Assignee: POSCO, Pohang-si (KR)

( * ) Notice: Subject to any disclaimer, the term of this patent is extended or adjusted under 35 U.S.C. 154(b) by 421 days.

(21) Appl. No.: 16/064,804

(22) PCT Filed: Dec. 23, 2016

(86) PCT No.: PCT/KR2016/015164
§ 371 (c)(1),
(2) Date: Jun. 21, 2018

(87) PCT Pub. No.: WO2017/111530
PCT Pub. Date: Jun. 29, 2017

(65) Prior Publication Data
US 2018/0371598 A1    Dec. 27, 2018

(30) Foreign Application Priority Data

Dec. 24, 2015 (KR) .................. 10-2015-0186313
Nov. 24, 2016 (KR) .................. 10-2016-0157102

(51) Int. Cl.
*C23C 2/28* (2006.01)
*C23C 2/00* (2006.01)
(Continued)

(52) U.S. Cl.
CPC ............... *C23C 2/28* (2013.01); *B32B 15/01* (2013.01); *B32B 15/013* (2013.01); *B32B 15/04* (2013.01);
(Continued)

(58) Field of Classification Search
CPC .... C23C 2/28; C23C 2/26; C23C 2/16; C23C 2/22; C23C 2/003; C23C 2/06;
(Continued)

(56) References Cited

U.S. PATENT DOCUMENTS 4,291,074 A    9/1981  Schoeps et al.
4,664,953 A    5/1987  Copas et al.
(Continued)

FOREIGN PATENT DOCUMENTS

CN    103904219    7/2014
EP    0162989    12/1985
(Continued)

OTHER PUBLICATIONS

Japanese Office Action—Japanese Application No. 2018-532720 dated Sep. 3, 2019, citing JP 2012-082511, JP 07-224366, JP 2003-147500, JP 2004-068075, JP 2001-329354, JP 2015-531817, US 2015/0159253, JP 2002-317233, JP 10-306357, JP2007-284718, JP 08-118469, JP 2017-104987, JP 60-194054, JP 2015-151625, JP 54-138335, JP 04-235264, JP 10-226865, U.S. Pat. No. 6,235,410, JP 2014-501334, KR 10-2012-0075235, KR 10-2012-0132442, JP 2018-538448, US 2018/0371598, JP 2018-507321, US 2019/0100831, JP 2018-532889.
(Continued)

*Primary Examiner* — Michael E. La Villa
(74) *Attorney, Agent, or Firm* — Cantor Colburn LLP

(57) ABSTRACT

Provided is a plated steel sheet having an excellent quality with fine and even plating texture, the plated steel sheet including a base steel sheet and a Zn plating layer formed on the base steel sheet, wherein a Zn crystal in the plating layer has a size of 5 μm or less.

13 Claims, 17 Drawing Sheets

Plating layer cross-sectional texture and SST result (0.5t)

SST (Salt Spray Test)

| Cooling rate after plating (°C/sec) | Plating layer cross-sectional texture | SST time(hr) | | | Plating layer thickness (μm) |
|---|---|---|---|---|---|
| | | 586 | 1016 | 1368 | |
| 2.4 | | | | | 7.9 |
| 9.2 | | | | | 6.6 |
| 10.5 | | | | | 6.8 |

(51) Int. Cl.
*C23C 2/06* (2006.01)
*C23C 2/20* (2006.01)
*C23C 2/22* (2006.01)
*C23C 2/40* (2006.01)
*C22C 18/04* (2006.01)
*B32B 15/01* (2006.01)
*C23C 2/26* (2006.01)
*C23C 2/16* (2006.01)
*C23C 28/02* (2006.01)
*C23C 30/00* (2006.01)
*B32B 15/04* (2006.01)
*C23C 28/00* (2006.01)
*B32B 15/18* (2006.01)
*C23C 18/00* (2006.01)

(52) U.S. Cl.
CPC ............ *B32B 15/043* (2013.01); *B32B 15/18* (2013.01); *C22C 18/04* (2013.01); *C23C 2/00* (2013.01); *C23C 2/003* (2013.01); *C23C 2/06* (2013.01); *C23C 2/16* (2013.01); *C23C 2/20* (2013.01); *C23C 2/22* (2013.01); *C23C 2/26* (2013.01); *C23C 2/40* (2013.01); *C23C 18/00* (2013.01); *C23C 28/02* (2013.01); *C23C 28/021* (2013.01); *C23C 28/023* (2013.01); *C23C 28/025* (2013.01); *C23C 28/3225* (2013.01); *C23C 30/00* (2013.01); *C23C 30/005* (2013.01); *Y10T 428/12729* (2015.01); *Y10T 428/12757* (2015.01); *Y10T 428/12799* (2015.01); *Y10T 428/12951* (2015.01); *Y10T 428/12958* (2015.01); *Y10T 428/12972* (2015.01); *Y10T 428/12979* (2015.01); *Y10T 428/12993* (2015.01)

(58) Field of Classification Search
CPC .... C23C 2/20; C23C 2/40; C23C 2/00; C23C 28/023; C23C 28/025; C23C 28/021; C23C 28/02; C23C 28/3225; C23C 30/00; C23C 30/005; B32B 15/013; B32B 15/04; B32B 15/043; B32B 15/18; B32B 15/01; C22C 18/00; C22C 18/04; Y10T 428/12799; Y10T 428/12951; Y10T 428/12958; Y10T 428/12972; Y10T 428/12979; Y10T 428/12993; Y10T 428/12757; Y10T 428/12729
See application file for complete search history.

(56) References Cited

U.S. PATENT DOCUMENTS

| | | | |
|---|---|---|---|
| 6,235,410 B1 | 5/2001 | Komatsu et al. | |
| 2009/0199934 A1* | 8/2009 | Liu | C23C 2/26 148/512 |
| 2015/0159253 A1 | 6/2015 | Oh et al. | |
| 2018/0320260 A1 | 11/2018 | Oh et al. | |
| 2018/0371598 A1 | 12/2018 | Kim | |
| 2019/0100831 A1 | 4/2019 | Oh et al. | |

FOREIGN PATENT DOCUMENTS

| | | |
|---|---|---|
| EP | 0905270 | 3/1999 |
| EP | 2631012 | 8/2013 |
| JP | 56057267 | 5/1981 |
| JP | 60194054 | 10/1985 |
| JP | 63057754 | 3/1988 |
| JP | H01279740 | 11/1989 |
| JP | 04235264 | 8/1992 |
| JP | H05033112 | 2/1993 |
| JP | 07224366 | 8/1995 |
| JP | 08118469 | 5/1996 |
| JP | 10226865 | 8/1998 |
| JP | 10306357 | 11/1998 |
| JP | 2001329354 | 11/2001 |
| JP | 2002285311 | 10/2002 |
| JP | 2002317233 | 10/2002 |
| JP | 2003147500 | 5/2003 |
| JP | 2003147501 | 5/2003 |
| JP | 2004068075 | 3/2004 |
| JP | 2005133151 | 5/2005 |
| JP | 2005256055 | 9/2005 |
| JP | 2007284718 | 11/2007 |
| JP | 2009114479 | 5/2009 |
| JP | 2011190507 | 9/2011 |
| JP | 2012082511 | 4/2012 |
| JP | 2015151625 | 8/2015 |
| JP | 2015531817 | 11/2015 |
| JP | 2017104987 | 6/2017 |
| JP | 2018507321 | 3/2018 |
| JP | 2018532889 | 11/2018 |
| JP | 2018538448 | 12/2018 |
| KR | 19960000868 | 2/1996 |
| KR | 20120132442 | 12/2012 |
| KR | 20150073314 | 7/2015 |
| WO | 2012091385 | 7/2012 |

OTHER PUBLICATIONS

PosMAC 3.0 Posco Magnesium Aluminum alloy Coating product, Aug. 2018, pp. 1-48.
European Search Report—European Application No. 16879397.4, dated Sep. 17, 2018, citing EP 0 905 270, JP 2002 285311 and WO 2012/091385.
Chinese Search Report—Chinese Application No. 201680079915.3 dated May 28, 2020, citing CN 103904219 and KR 2015-0073314.
European Search Report—European Application No. 16879397.4, dated Dec. 18, 2018, citing EP 0 905 270, JP 2002 285311, and WO 2012/091385, EP 0 162 989, JP H05 33112, JP 2009 114479, EP 2 631 012 and JP S63 57754.

* cited by examiner

FIG. 11

Plating layer cross-sectional texture and SST result (0.5t)

| Cooling rate after plating (°C/sec) | Plating layer cross-sectional texture | SST (Salt Spray Test) | | | Plating layer thickness (μm) |
|---|---|---|---|---|---|
| | | SST time(hr) | | | |
| | | 586 | 1016 | 1368 | |
| 2.4 | | | | | 7.9 |
| 9.2 | | | | | 6.6 |
| 10.5 | | | | | 6.8 |

| No | Double-sided plating amount(g/m2) | Cooling rate (°C/sec) | Zn single-phase fraction (Area%) | Zn single-phase average particle size(μm) | *Frequency of plating defects Crack | *Frequency of plating defects Pitting | *Frequency of plating defects Total | Zn phase ratio = (101)/(002) | MgZn2 phase ratio = (112)/(201) | Remarks |
|---|---|---|---|---|---|---|---|---|---|---|
| C1 | 120 | 5.4 | 16.01 | 5.53 | 2 | 2 | 4 | 0.27 | 0.31 | Comparative Example |
| C2 | 180 | 6.1 | 10.64 | 5.49 | 3 | 2 | 5 | 0.92 | 0.27 | |
| C3 | 250 | 5.8 | 14.10 | 6.49 | 3 | 5 | 8 | 0.74 | 0.36 | |
| C4 | 300 | 6.8 | 14.89 | 5.13 | 6 | 3 | 9 | 0.49 | 0.3 | |
| C5 | 350 | 4.9 | 13.29 | 7.12 | 14 | 4 | 18 | 0.96 | 0.32 | |
| P1 | 404 | 10.6 | 23.90 | 2.93 | 0 | 0 | 0 | 0.64 | 0.73 | Example |
| P2 | 460 | 15.4 | 24.70 | 2.30 | 0 | 0 | 0 | 0.69 | 0.78 | |
| P3 | 443 | 21.1 | 24.61 | 2.61 | 0 | 0 | 0 | 1.03 | 0.78 | |
| P4 | 402 | 30.3 | 26.61 | 2.16 | 0 | 0 | 0 | 1.33 | 0.8 | |
| P5 | 398 | 54.6 | 25.47 | 2.47 | 0 | 0 | 0 | 1.48 | 1.98 | |

FIG. 17
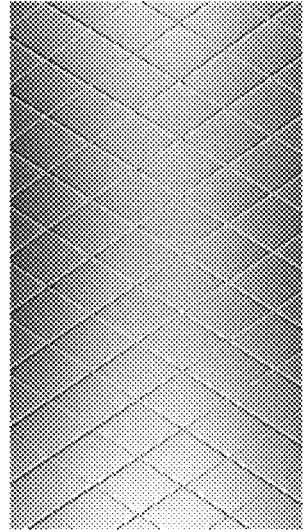
<Pattern Example 2>
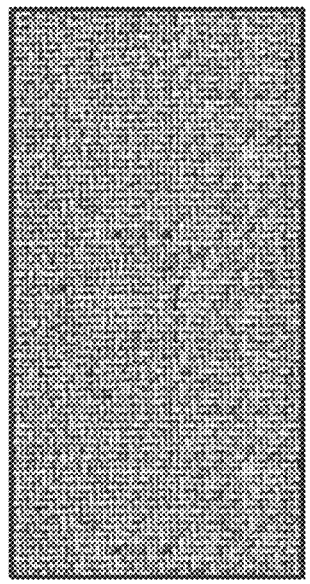
<Pattern Example 1>
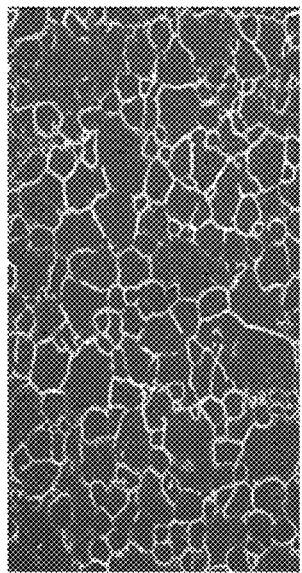
<Pattern Example 3>

PLATED STEEL SHEET HAVING FINE AND EVEN PLATING STRUCTURE

TECHNICAL FIELD

The present invention relates to a plated steel sheet, and more particularly, to a plated steel sheet having an excellent quality with fine and even plating texture manufactured through rapid cooling, and a plated steel sheet manufacturing method.

BACKGROUND ART

For example, a technique for imparting corrosion resistance by plating a zinc-based metal or a metal alloy on a surface of a steel sheet has been extensively performed. Plated steel sheets are increasingly used in not only general building materials, due to excellent corrosion resistance, but also exterior materials for home appliances, automobiles, shipbuilding, etc., which require beautiful surface management.

A continuous galvanizing line (CGL) is a facility to produce a plated steel sheet by adhering molten zinc to a surface of a steel sheet. In the continuous galvanizing line, the steel sheet is plated in a plating pot containing molten zinc through a sink roll disposed in the plating pot.

The steel sheet to which molten zinc is adhered passes through the sink roll and switched to come out to the top of the plating pot. The steel sheet drawn out from the zinc-plated pot is then subjected to a process of adjusting a plating adhesion amount on a steel sheet surface, and cooling a plating layer, thereby manufacturing a plated steel sheet.

In recent years, a variety of companies are producing the plated steel sheets. In order to more increase competitiveness of products, it is required to develop a more high-quality plated steel sheet.

DISCLOSURE

Technical Problem

The present invention has been made in an effort to provide a plated steel sheet having excellent quality with fine and even plating texture, and a plated steel sheet manufacturing method.

Technical Solution

An exemplary embodiment of the present invention provides a plated steel sheet having a fine and even plating texture, the plated steel sheet including: a Zn-based plating layer formed on a steel sheet by hot-dipping, then contact-type pressure cooling, wherein the Zn-based plating layer includes a Zn single-phase texture having an average particle size of 5 µm or less.

According to an embodiment of the present invention, a size of a sequin of the plating layer may be 300 to 500 µm.

According to an embodiment of the present invention, the plating layer may further include a Mg component, and the plating layer may include a $MgZn_2$ phase.

According to an embodiment of the present invention, a (112)/(201) ratio on the $MgZn_2$ phase may be 0.6 or more.

According to an embodiment of the present invention, the plating layer may be a Zn—Al—Mg alloy plating layer further including an Al component.

According to an embodiment of the present invention, a fraction of the Zn single-phase of the plating layer may be 15 to 40% by area.

According to an embodiment of the present invention, the Zn single-phase distribution in the plating layer may be even with respect to a thickness direction of the plating layer.

According to an embodiment of the present invention, the plated steel sheet may be formed under a condition that the Zn single-phase distribution B/A in the plating layer is 0.5 to 1.0. Here, A is a fraction of the entire Zn single-phase with respect to the thickness direction of the plating layer and B is a fraction of the Zn single-phase in an outer surface layer portion of the plating layer.

According to an embodiment of the present invention, the plating layer may have a thickness of 5 to 50 µm.

According to an embodiment of the present invention, the plating layer may have a contact-type pressure cooling pattern on a surface thereof.

The contact-type pressure cooling pattern may be in the form of a woven cloth, a net, or an irregularly intertwined line.

The pattern of the surface of the plating layer in the present embodiment may be formed by transferring a surface pattern of a cooling belt which is closely adhered with pressure to a plating layer on a surface of the steel sheet and applies cold air thereto.

Another embodiment of the present invention provides a plated steel sheet manufacturing method including: plating a steel sheet, adjusting a plating adhesion amount of the steel sheet, and quenching the steel sheet at a cooling rate of 20° C./sec or more.

Yet another embodiment of the present invention provides a plated steel sheet manufacturing method including: plating a steel sheet; adjusting a plating adhesion amount of the steel sheet; and quenching the steel sheet by including cooling the steel sheet by applying cold air to the steel sheet with a cooling body in contact with a plating layer on a surface of the steel sheet, and cooling the cooling body by supplying a cryogenic liquid including liquid nitrogen or liquid helium to the cooling body.

Yet another embodiment of the present invention provides a plated steel sheet manufacturing method including: plating a steel sheet; adjusting a plating adhesion amount of the steel sheet including primarily adjusting the plating adhesion amount with a knife in contact with the plating layer on the surface of the steel sheet; and cooling the knife by supplying a cryogenic liquid including liquid nitrogen or liquid helium to the knife, and cooling the steel sheet.

The adjusting may include primarily adjusting the plating adhesion amount with a knife in contact with the plating layer on the surface of the steel sheet, and cooling the knife by supplying a cryogenic liquid including liquid nitrogen or liquid helium to the knife.

The adjusting may further include cooling the steel sheet by secondarily adjusting a plating adhesion amount with a chill roll adhering closely to the plating layer on the surface of the steel sheet, and cooling the chill roll by supplying a cryogenic liquid including liquid nitrogen or liquid helium to the chill roll.

In the adjusting, a tip part of the knife may be maintained at a temperature of −250 to 5° C.

In the adjusting, the chill roll may be maintained at a temperature of −250 to 5° C.

In the adjusting, the cooling body may be maintained at a temperature of −250 to 5° C.

The plated steel sheet may be quenched to a temperature of 250° C. or less at a cooling rate of 20° C./sec or more.

The plated steel sheet manufacturing method may further include using an exhaust gas from the liquid nitrogen used in the adjusting or the cooling as a reducing gas in a heat treatment furnace or a gas for maintaining an atmosphere in the cooling.

The cooling may further include transferring a pattern formed on a surface of the cooling body to the plating layer to form the pattern on a surface of the plating layer.

Advantageous Effects

The plated steel sheet according to the embodiment as described above has almost no surface defects, and has a fine and even plating texture in which a single-phase texture has an average particle size of 5 µm or less.

Further, the plated steel sheet of the present embodiment is more precisely adjusted in a plating adhesion amount, and thus a deviation in plating adhesion amount or a deviation of plating layer texture is very small.

Thus, the plated steel sheet of the present embodiment may have a low surface defect and may have a very excellent quality in view of corrosion resistance, crack resistance, and the like.

DESCRIPTION OF THE DRAWINGS

FIG. 11 is an electron microscope image showing a cross-sectional texture of the plating layer when a cooling rate is increased with respect to Comparative Example.

FIG. 17 shows a plated steel sheet having a pattern formed on a surface of the plating layer according to the present embodiment.

MODE FOR INVENTION

Figure 1:
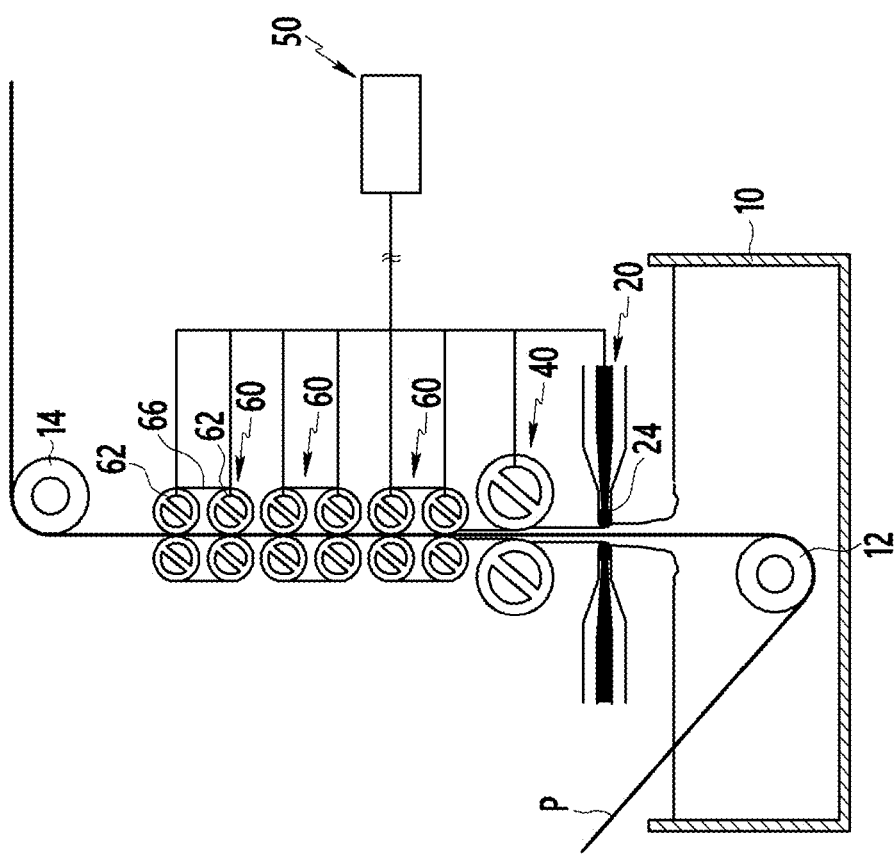
FIG. 1 is a schematic view showing a hot-dip galvanizing apparatus according to the present embodiment.

Hereinafter, exemplary embodiments of the present invention will be described in detail with reference to the accompanying drawings so that those skilled in the art may easily practice the present invention. It will be apparent to those skilled in the art that the embodiments described below may be modified in various ways without departing from the spirit and scope of the invention, and they are not limited to Examples to be described herein.

The drawings are schematic and are not shown to scale. The relative dimensions and ratios of the parts in the drawings are exaggerated or reduced in size for clarity and convenience in the drawings, and any dimensions are merely illustrative and not restrictive.

[Plated Steel Sheet Manufacturing Apparatus]

Hereinafter, a manufacturing apparatus for manufacturing the plated steel sheet according to the present embodiment will be described.

The present embodiment describes a hot-dip galvanizing apparatus for plating a zinc-based metal or a metal alloy on a surface of a steel sheet with a plating apparatus as an example. The present plating apparatus is not limited to the plating of a zinc-based metal or a metal alloy, and is applicable to all hot-dip plating apparatuses for various metals.

FIG. 1 is a schematic view showing a hot-dip galvanizing apparatus according to the present embodiment.

As shown in FIG. 1, the plating apparatus of the present embodiment includes a plating bath 10 hot-dipping a steel sheet P, a wiping part disposed on one side or both sides of the steel sheet at a rear end of the plating bath 10 along a proceeding direction of the steel sheet to adjust a plating adhesion amount of the steel sheet, and a cooling part disposed on one side or both sides of the steel sheet at a rear end of the wiping part along the proceeding direction of the steel sheet to cool the steel sheet.

The steel sheet P guided to the plating bath 10 is put into the molten metal through the sink roll 12 disposed in the plating bath 10 and a hot-dip plating process proceeds. The steel sheet P is shifted in a proceeding direction by the sink roll 12 and moved to an upper portion of the plating bath 10. The steel sheet P of which a surface is plated by the molten metal in the plating bath 10 is drawn out to the upper portion of the plating bath 10. The steel sheet is made of a plated steel sheet through the wiping part and the cooling part which are sequentially disposed along the proceeding direction. The steel sheet quenched by the cooling part is processed through a tension roll 14.

In the present embodiment, the wiping part is configured to directly contact the plating layer adhered to the surface of the steel sheet, thereby adjusting the plating adhesion amount.

To this end, the wiping part may include a knife 20 contacting the plating layer on the surface of the steel sheet P and controlling the plating adhesion amount, and a coolant supplying part 50 supplying a cryogenic liquid including liquid nitrogen or liquid helium to the knife 20 to cool the knife 20.

By directly contacting the knife 20 to the plating layer, it is possible to prevent the incorporation of oxides in a plating bath surface and to more easily control the plating adhesion amount of the steel sheet. The coolant supplying part 50 reduces a temperature of the knife 20 by cooling the knife 20 with a cryogenic liquid, and thus it is possible to prevent the plating solution from being fused to the knife 20 even when the knife 20 is in direct contact with the plating layer at a high temperature.

Further, in the present embodiment, the cooling part is configured to directly contact the plating layer on the surface of the steel sheet, thereby cooling the steel sheet.

To this end, the cooling part may include at least one cooling body 60 adhering closely to the plating layer on the surface of the steel sheet, thereby cooling the plating layer, and a coolant supplying part 50 supplying a cryogenic liquid including liquid nitrogen or liquid helium to the cooling body 60 to cool the cooling body 60.

By directly contacting the cooling body 60 with the plating layer to cool the plating layer of the steel sheet, cooling capacity is maximized, and thus the steel sheet plating layer is able to be quenched more quickly. The cooling part reduces a temperature of the cooling body 60 by cooling the cooling body 60 with a cryogenic liquid, and thus it is possible to prevent the plating solution from being fused to the cooling body 60 even when the cooling body 60 is in direct contact with the plating layer at a high temperature.

The coolant supplying part 50 is for supplying the cryogenic liquid to the knife 20 or the cooling body 60. For example, the coolant supplying part 50 may include a tank containing the cryogenic liquid, a supply line through which the cryogenic liquid is transferred, and a feed pump installed on a feed line. The coolant supplying part 50 is applicable to all the structures capable of supplying cryogenic liquid and may be variously modified.

As the cryogenic liquid used in the coolant supplying part 50, various liquids such as liquid nitrogen, liquid helium, liquid argon, and the like, may be used. The economical efficiency is able to be improved more than when the liquid nitrogen is used.

As described above, a plating amount of the steel sheet may be controlled and the steel sheet may be quenched by directly contacting the steel sheet P with the knife 20 and the cooling body 60 cooled with the cryogenic liquid, thereby precisely controlling the plating adhesion amount of the plated steel sheet and increasing a cooling rate of the plated steel sheet to 20° C./sec or more according to the present embodiment. Therefore, it is possible to dramatically shorten a facility line length for cooling the steel sheet and increase a product production speed.

The cryogenic liquid supplied to the knife 20 or the cooling body 60 through the coolant supplying part 50 may be gasified by heat exchange with the plating layer while passing through the knife 20 or the cooling body 60. The gas discharged from the knife 20 or the cooling body 60 may be recycled through a suitable filtration apparatus to be used as a reducing gas in a furnace of a steelmaking process or as a gas for maintaining a non-oxidizing atmosphere in a cooling process.

Figure 2:
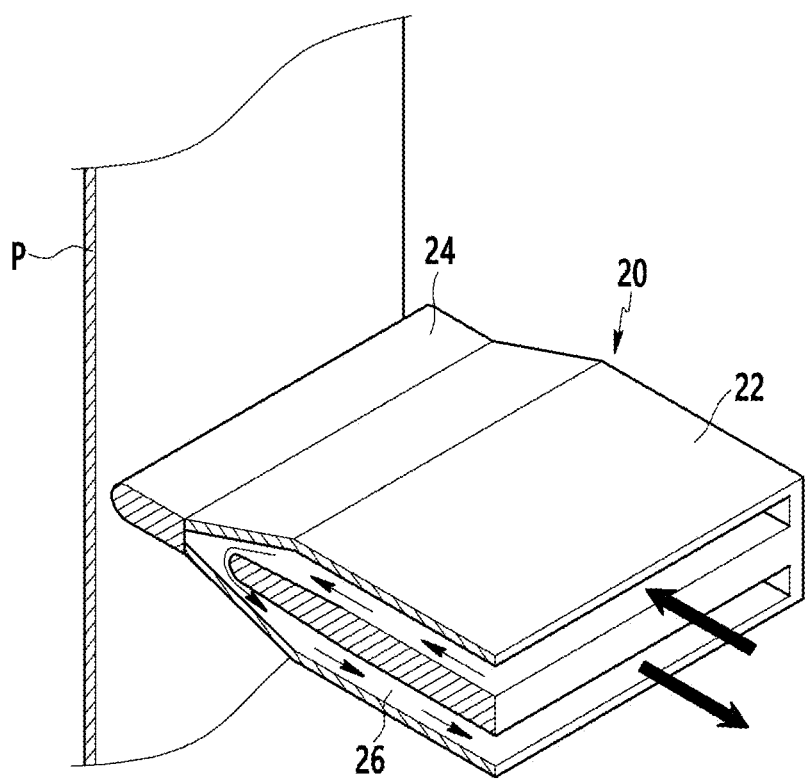
FIG. 2 is a schematic view showing a knife structure of the hot-dip galvanizing apparatus according to the present embodiment.

FIG. 2 shows a specific structure of the knife according to the present embodiment.

In the present embodiment, the knife 20 is disposed to face on both sides of the steel sheet so as to adjust the adhesion amount of the plating solution on both sides of the steel sheet P. The knife 20 disposed on both sides of the steel sheet P has the same structure, and the following description is provided by taking only the knife 20 with respect to one surface of the steel sheet as an example.

As shown in FIG. 2, the knife 20 may include a body 22 extending in the width direction of the steel sheet P and having a cryogenic liquid circulated therein, and a tip part 24 disposed at the top of the body 22 and contacting the plating layer of the steel sheet, thereby primarily controlling the plating adhesion amount of the surface of the steel sheet.

The body 22 and the tip part 24 may be made of metal, ceramic, ceramic coated metal material, or the like, having excellent cryogenic temperature durability so that as to be stably used for a long time in a cryogenic environment due to the use of liquid nitrogen.

The body 22 is formed with a flow path 26 therein so that the cryogenic liquid passes therethrough. The coolant supplying part 50 connected to the body 22 circulates and supplies the cryogenic liquid through the flow path 26. The flow path 26 extends to the top of the tip part 24 so that the tip part 24 provided at the top of the body 22 is able to be sufficiently cooled, and thus the tip part 24 is able to be in contact with the cryogenic liquid.

In the present embodiment, the tip part 24 may be detachably installed to the body 22.

The tip part 24 is worn due to continuous contact with the plating layer at a high temperature. Thus, when the consumable tip part 24 is worn, it may be replaced with a replaceable component, and thus the knife 20 may be continuously used by replacing only the tip part 24 in the body 22. The tip part 24 may be structured to be pointed toward the top for more precise control of the plating adhesion amount.

The cryogenic liquid supplied to the body 22 is circulated along the flow path 26 to cool the tip part 24, and thus the tip part 24 maintains a low temperature state. Thus, the tip part 24 may prevent the plating solution from adhering to the tip part 24 while being in contact with the plating layer, and more precisely control the plating adhesion layer primarily.

Figure 3:
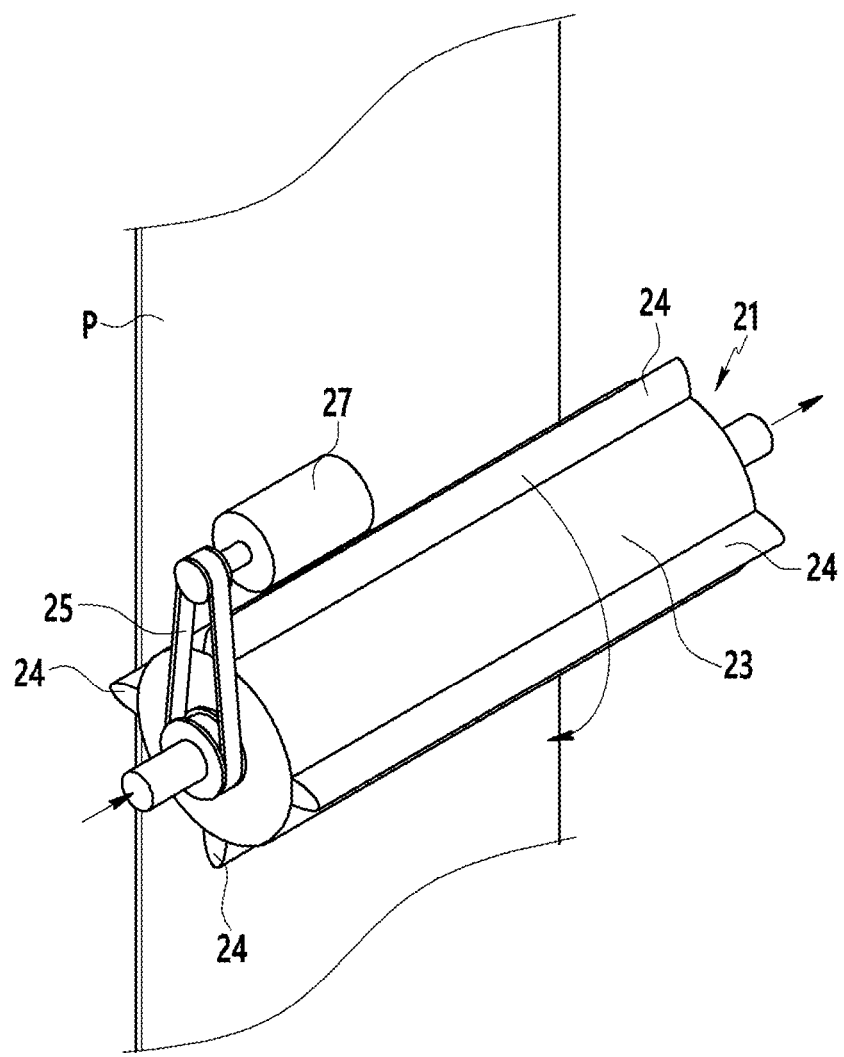
FIG. 3 is a schematic view showing another embodiment of the knife of the hot-dip galvanizing apparatus according to the present embodiment.

FIG. 3 shows another embodiment of the knife. The knife according to the Example of FIG. 3 is configured to include a plurality of tips so that the knife can be exchanged and used immediately when the tip part is abnormal.

To this end, the knife 21 of the present embodiment may include a rotating body 23 extending in a width direction of the steel sheet and rotatably installed, in which a cryogenic liquid is circulated, the tip part 24 installed on an outer circumferential surface of the rotating body 23 at intervals along a circumferential direction and contacting the plating layer on the surface of the steel sheet P to control the plating adhesion amount, and a rotation driving part connected to the rotating body 23 to rotate the rotating body 23 so as to dispose an one-side tip part 24 toward the surface of the steel sheet.

Accordingly, when an abnormality such as abrasion of the tip part 24 occurs, the rotating body 23 is rotated to move the tip part 24 away from the steel sheet and move the other tip part 24 on standby toward the steel sheet, and thus the tip part 24 is able to be replaced and used. As shown in FIG. 3, four tip parts 24 may be disposed at an angle of 90 degrees along an outer circumferential surface of the rotating body 23. Thus, the rotating body 23 is rotated at an angle of 90 degrees, and thus the respective tip parts 24 may be moved toward the surface of the steel sheet. The number of the tip parts 24 may be variously changed.

In the present embodiment, the rotating body 23 may be formed in a cylindrical shape. The rotating body 23 is not limited to a cylindrical shape, and may be a structure in which the above-described body 22 is continuously disposed at an angle, for example, along an outer peripheral surface of a rotating shaft. Both tops of the rotating body 23 may be rotatably supported on a separate support (not shown) on the facility.

The rotating body 23 may also be made of metal, ceramic, ceramic coated metal material, or the like, having excellent cryogenic temperature durability so that the rotating body 23 is able to be stably used for a long time in a cryogenic environment due to the use of liquid nitrogen.

The rotating body 23 has a flow path (not shown) formed therein so that the cryogenic liquid passes therethrough. The flow path formed inside the rotating body 23 may be connected to the coolant supplying part 50 through both tops of the rotating shaft of the rotating body 23. The cryogenic liquid supplied from the coolant supplying part 50 is circulated and supplied to the flow path inside the rotating body 23 through the top of the rotating body 23. The flow path extends to the surface on which the tip part 24 is positioned so that the tip part 24 installed on an outer circumferential surface of the rotating body 23 is able to be sufficiently cooled, and thus the tip part 24 may be in contact with the cryogenic liquid.

The tip part 24 is installed on the surface of the rotating body 23 along an axial direction. The tip part 24 may be detachably installed on the surface of the rotating body 23.

The rotation driving part is applicable as long as it has a structure in which the rotating body 23 is rotated by a predetermined angle. As shown in FIG. 3, for example, the rotating driving part may include a step motor 27 connected to the rotating body 23 by a driving belt 25 to transmit power. Thus, when the step motor 27 is driven to rotate by a predetermined amount, power is transmitted to the rotating body 23 through the driving belt 25 so that the rotating body 23 is rotated by a disposition interval of the tip part 24. A new tip part 24 on standby which is installed on the surface of the rotating body 23 according to the rotation of the rotating body 23 moves toward the steel sheet to be in contact with the plating layer on the surface of the steel sheet. In addition, the tip part 24, which is worn or abnormal due to the rotation of the rotating body 23, is spaced outwardly from the surface of the steel sheet and moved to a standby position. The worn tip part 24 is treated at the standby position by a replacement or surface polishing operation.

As described above, in the present embodiment, by replacing the tip part 24 simply by rotating the rotating body 23 at a predetermined angle, it is possible to reduce time required for replacing the tip part 24 and to perform the work continuously.

In the present embodiment, the knife 20 and 21 may circulate the cryogenic liquid inside to cool the tip part 24 to −250 to 5° C. If the temperature of the tip part 24 is higher than 5° C., there is a problem that the plating solution at a high temperature is adhered to the tip part 24. If the temperature of the tip part 24 is lower than −250° C., a low temperature brittle fracture problem of the tip part 24 occurs.

In addition, the knife 20 and 21 is moved with respect to the steel sheet to precisely adjust the plating adhesion amount by the tip part 24.

Figure 4:
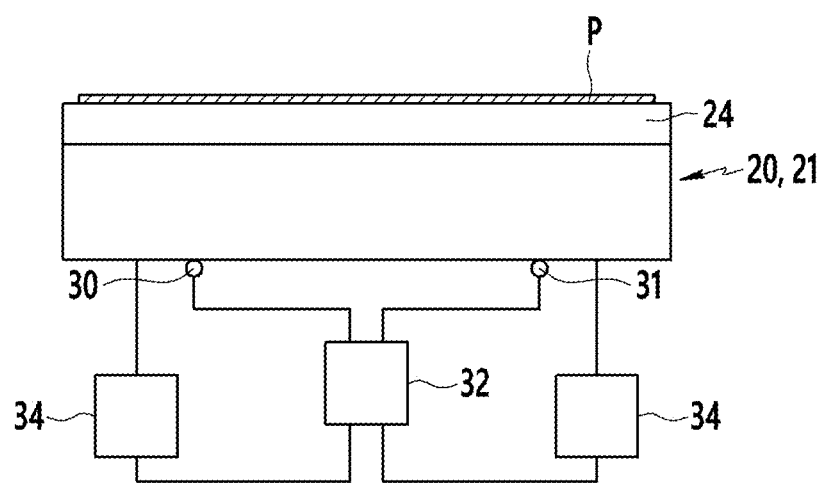
FIG. 4 is a schematic view showing a contact load control structure for the steel sheet of the knife according to the present embodiment.

As shown in FIG. 4, in order to precisely control the plating adhesion amount by the knife 20, the wiping part may further include a load sensor 30 provided on the knife 20 to detect a contact load of the tip part 24 with respect to the steel sheet P, and a controlling part 32 controlling a pressing force of the tip part 24 with respect to the steel sheet by moving the knife 20 with respect to the steel sheet according to a detection signal of the load sensor 30.

The knife 20 is closer to the plating layer of the steel sheet or is spaced outwardly from the plating layer, and thus an interval between the tip part 24 and the steel sheet P is changed to adjust the plating adhesion amount of the steel sheet.

The interval between the tip part 24 and the steel sheet P may be confirmed by the contact load of the tip part detected through the load sensor 30. When the interval between the tip part 24 and the steel sheet P is narrowed, the tip part 24 deepens into the plating layer of the steel sheet and a contact amount with the plating solution increases, thereby increasing the contact load. On the contrary, when the tip part 24 is spaced from the steel sheet P, the contact amount with the plating solution decreases, thereby decreasing the contact load.

The controlling part 32 calculates a detection value of the load sensor 30 and moves the knife 20 with respect to the steel sheet P according to the primarily set plating adhesion amount to control the plating adhesion amount.

The movement of the knife 20 with respect to the steel sheet may be accomplished, for example, through a driving part 34, such as a driving cylinder, coupled to the knife 20, or the like. The driving part 34 may be a variety of power sources such as a driving cylinder, a motor, or the like, and is applicable as long as it has a structure in which the knife 20 is able to be linearly moved with respect to the steel sheet.

In addition, the controlling part 32 may detect a change in a measurement value of the load sensor 30 and check whether the apparatus is abnormal. It is possible to immediately take necessary measures such as replacing the tip part 24 in the knife 20, and the like, when the abnormality in the apparatus is determined.

Figure 5:
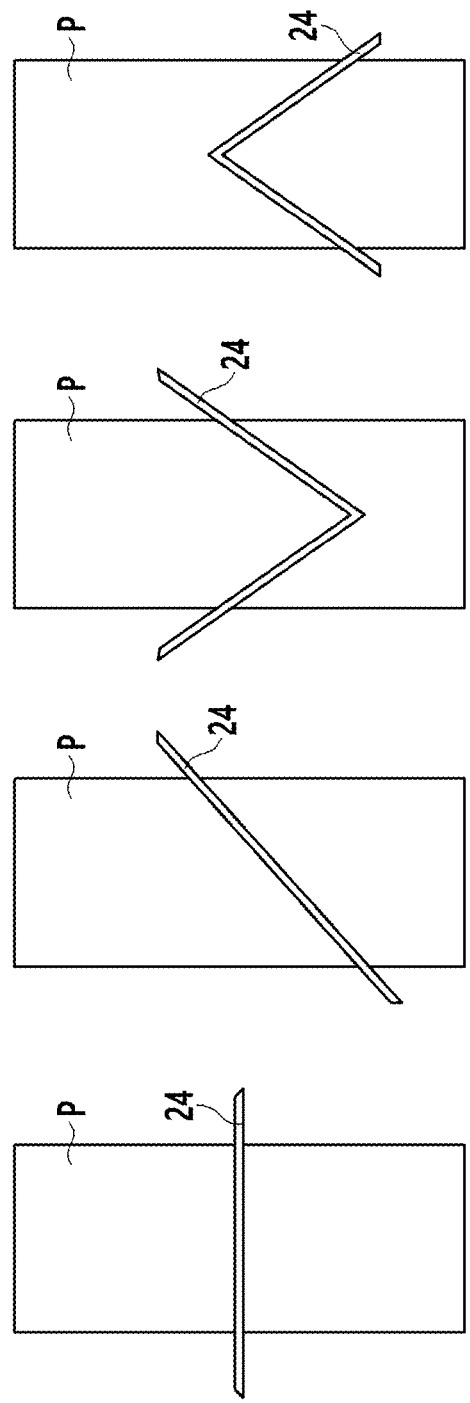
FIG. 5 is a schematic view showing various embodiments of a structure of a tip part of the knife and a structure in which the tip part with respect to the steel sheet is disposed.

FIG. 5 shows a structure of a form of the tip part of the knife with respect to the steel sheet and a structure in which the tip part with respect to the steel sheet is disposed.

In the present embodiment, the tip part 24 installed on the knife 20 and 21 may have a variety of structures, such as a linear form, a V-shaped structure by folding the middle, and the like. The body 22 or the rotating body 23 of the knife installed with the tip part 24 may also have the same structure as that of the tip part 24. For example, when the tip part 24 is formed in a V-shape, a top part of the body 22 of the knife 20 on which the tip part 24 is installed may also be formed in a V-shape having the same shape as the tip part 24.

As shown in FIG. 5, the tip part 24 may be disposed on the steel sheet P in parallel with the width direction. Further, the tip part 24 may be inclined with respect to the width direction of the steel sheet.

Further, in the case of the structure in which the tip part 24 is bent in a V-shape, the tip part may be disposed in an inverted V-shape or V-shape so that a bent portion is directed in a moving direction of the steel sheet or in a direction opposite to the moving direction of the steel sheet.

By varying the disposition of the tip parts 24 that are in contact with the plating layer with respect to the steel sheet P, the contact load between the plating layer and the tip part 24 may be reduced to more smoothly adjust the adhesion amount of the plating layer.

Figure 6:
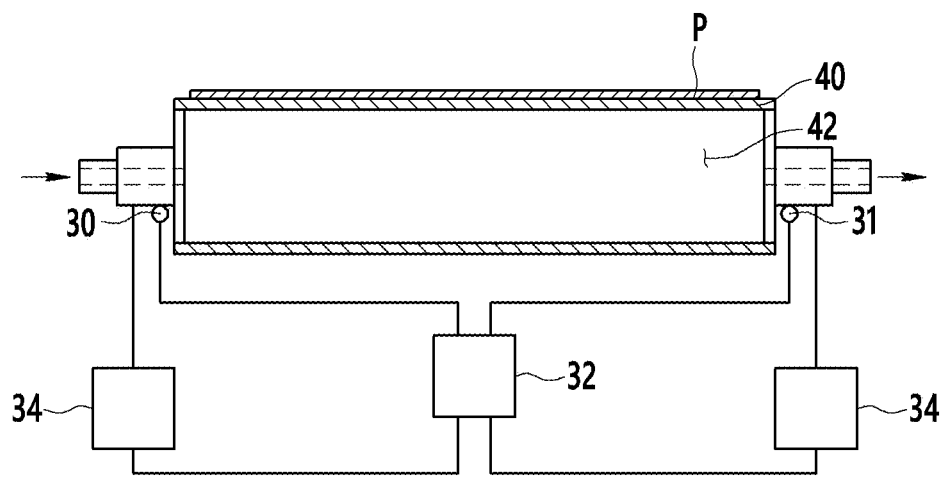
FIG. 6 is a schematic view showing a chill roll structure of the hot-dip galvanizing apparatus according to the present embodiment.

As shown in FIGS. 1 and 6, the wiping part may further include a chill roll 40 to be disposed at a rear end of the knife 20 along a proceeding direction of the steel sheet to control the plating adhesion amount of the steel sheet more precisely and to quench the plating layer of the steel sheet.

The chill roll 40 is a roll structure disposed in a width direction of the steel sheet and closely adhered with pressure to the plating layer. Both tops of the chill roll 40 may be rotatably supported on a separate support (not shown) on the facility. The chill roll 40 may be freely rotatable, and may be rotated together with the movement of the steel sheet, or may be connected to another driving source and rotated at a set speed.

In the present embodiment, the chill roll 40 may have an average surface roughness of 0.1 to 3 μm.

If the surface roughness of the chill roll 40 is higher than 3 μm, an uneven post-treatment problem occurs due to poor surface quality. When the surface roughness of the chill roll 40 is lower than 0.1 μm, a problem that post-treatment characteristics such as chemical conversion treatment are deteriorated occurs.

The chill roll 40 has a structure in which a cryogenic liquid is circulated inside and cooled to a low temperature. The chill roll 40 may be formed of a metal, a ceramic, a ceramic coated metal material, or the like, having excellent cryogenic temperature durability so that the chill roll 40 is stably usable for a long time in a cryogenic environment according to use of liquid nitrogen.

As shown in FIG. 6, the chill roll 40 has a flow path formed therein so that the cryogenic liquid passes therethrough. The flow path formed inside the chill roll 40 may be connected to the coolant supplying part (see 50 in FIG. 1) through both tops of the rotating shaft of the chill roll 40. The cryogenic liquid supplied from the coolant supplying part 50 is circulated and supplied to the flow path inside the chill roll 40 through the top of the chill roll 40. A surface of the chill roll 40 is maintained in a low-temperature cooling state by the cryogenic liquid supplied into the chill roll 40. Thus, the chill roll 40 prevents the plating solution from adhering to the surface of the chill roll 40 in a state of being in contact with the plating layer of the steel sheet P, and may rapidly cool the plating layer.

Thus, the chill roll 40 closely adheres to the plating layer on the surface of the steel sheet P, and secondarily precisely controls the plating adhesion amount of the steel sheet P which is primarily passed through the knife 20. In addition, the chill roll 40 is in contact with the plating layer so that the plating layer may be rapidly cooled through direct heat exchange.

In the present embodiment, the chill roll 40 may circulate the cryogenic liquid inside to cool the temperature to −250 to 5° C. When the temperature of the chill roll 40 is higher than 5° C., there is a problem that cooling performance and surface quality improving efficiency of the plated steel sheet are deteriorated. If the temperature of the chill roll 40 is lower than −250° C., a low temperature brittle fracture problem of the chill roll 40 occurs.

As described above, in the plating apparatus of the present embodiment, it is possible to more precisely control the plating adhesion amount through the knife 20 and chill roll 40 which are in contact with the plating layer of the steel sheet. In addition, the chill roll 40 cooled at a low temperature pressurizes the plating layer to rapidly cool the structure of the plating layer, thereby forming texture of the plating layer to be fine and effectively reducing deviation of the plating adhesion amount in the width direction.

The chill roll 40 may be in contact with the plating layer to solidify the plating solution within a shorter time, and thus the plating apparatus may quench the steel sheet at a cooling rate of 20° C./sec. In addition, since the chill roll 40 is cooled while pressurizing the plating layer under a predetermined pressure, plating performance may be improved even with respect to a steel grade which is difficult to be plated.

Further, in the present embodiment, the sink roll 12 of the plating bath 10 and the chill roll 40 interlock with each other to support the steel sheet P, and thus, a bending phenomenon in which the steel sheet is bent in the width direction in a process of passing through the contact-type knife 20 does not occur at all. That is, at a front end and a rear end of the knife 20 along a moving direction of the steel sheet, the steel sheet passes through the sink roll 12 and the chill roll 40, respectively. Thus, the steel sheet P passes through the knife 20 in a state in which the steel sheet P is flatly spread by the sink roll 12 and the chill roll 40 without the bending phenomenon.

When the steel sheet is bent, a deviation of the plating adhesion amount in the width direction occurs, and plating surface defects such as a comb-like defect, and the like, due to lateral over-plating occur. In the case of the conventional structure, plating surface defects are frequently caused by the bending phenomenon of the steel sheet, but in the present embodiment, the occurrence of bending of the steel sheet may be prevented, and thus it is possible to manufacture a plated steel sheet having almost no plating adhesion amount in the width direction and no deviation of the plating layer texture.

In order to precisely control the plating adhesion amount by the chill roll 40, the wiping part may further include, similar to the knife, a load sensor 30 provided on the chill roll 40 to detect a contact load of the chill roll 40 with respect to the steel sheet P, and a controlling part 32 controlling a pressing force of the chill roll 40 with respect to the steel sheet by moving the chill roll 40 with respect to the steel sheet by operating the driving part 34 according to a detection signal of the load sensor.

The chill roll 40 is closer to the plating layer of the steel sheet P or is spaced outwardly from the plating layer, and thus an interval between the chill roll 40 and the steel sheet is changed to precisely adjust the plating adhesion amount of the steel sheet.

The structures of the load sensor and the controlling part with respect to the chill roll 40 are the same as the structures of the load sensor 30, the controlling part 32 and the driving part 34 with respect to the above-described knife 20, and thus the same reference numerals are used, and the structures and operations thereof are described with reference to the description of the load sensor 30 and the controlling part 32 with respect to the knife 20, and a detailed description thereof is omitted. Accordingly, the controlling part 32 calculates the detection value of the load sensor 30, moves the chill roll 40 with respect to the steel sheet, thereby pressing the plating layer, and thus it is possible to more precisely control the plating adhesion amount. Further, the plating layer is rapidly cooled by the chill roll at a cooling rate of 20° C./sec or more while the plating layer is pressed, and thus the plating layer having a finer texture may be obtained while minimizing the deviation of the plating adhesion amount in the width direction.

Figure 7:
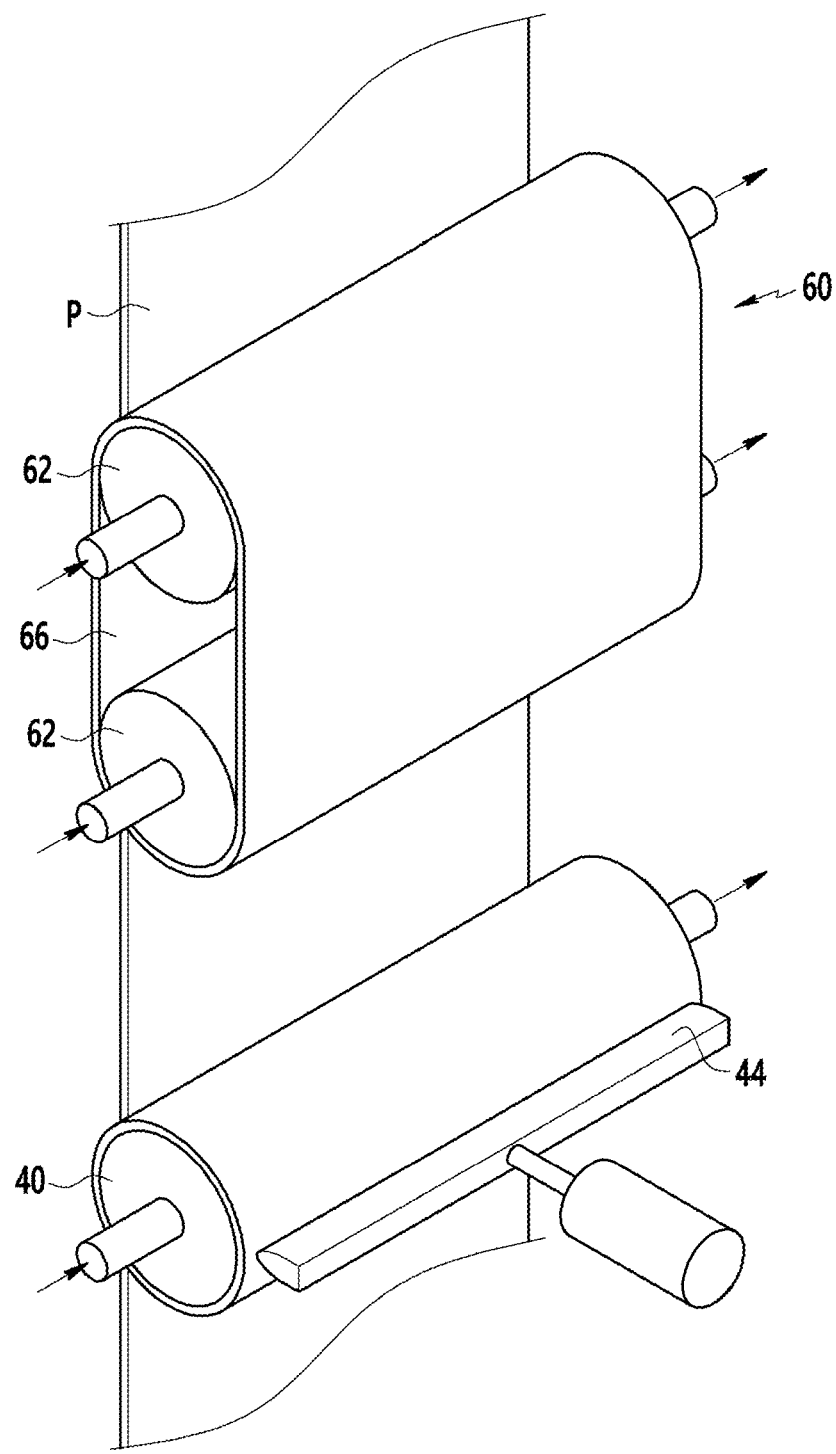
FIGS. 7 to 8 are schematic views showing a structure of a cooling part of the hot-dip galvanizing apparatus according to the present embodiment.

Further, the wiping part is configured to remove contaminants on the surface of the chill roll 40 in case the surface of the chill roll 40 is contaminated. To this end, as shown in FIG. 7, the wiping part may further include a scraper 44 for removing the contaminants adhering to the surface of the chill roll 40 in contact with the chill roll 40. The scraper 44 may extend in an axial direction of the chill roll 40 so as to be in contact with the surface of the chill roll 40. Accordingly, as the chill roll 40 rotates, the contaminants adhering to the surface of the chill roll 40 are caught by the scraper 44 and removed from the surface of the chill roll 40.

The steel sheet with the plating adhesion amount precisely controlled through the wiping part and quenched, is rapidly cooled to a set temperature or less while passing through a cooling part disposed at a rear end of the wiping part. Further, in the present embodiment, the thickness of the plating layer is precisely controlled while passing through the cooling part of the steel sheet.

Figure 8:
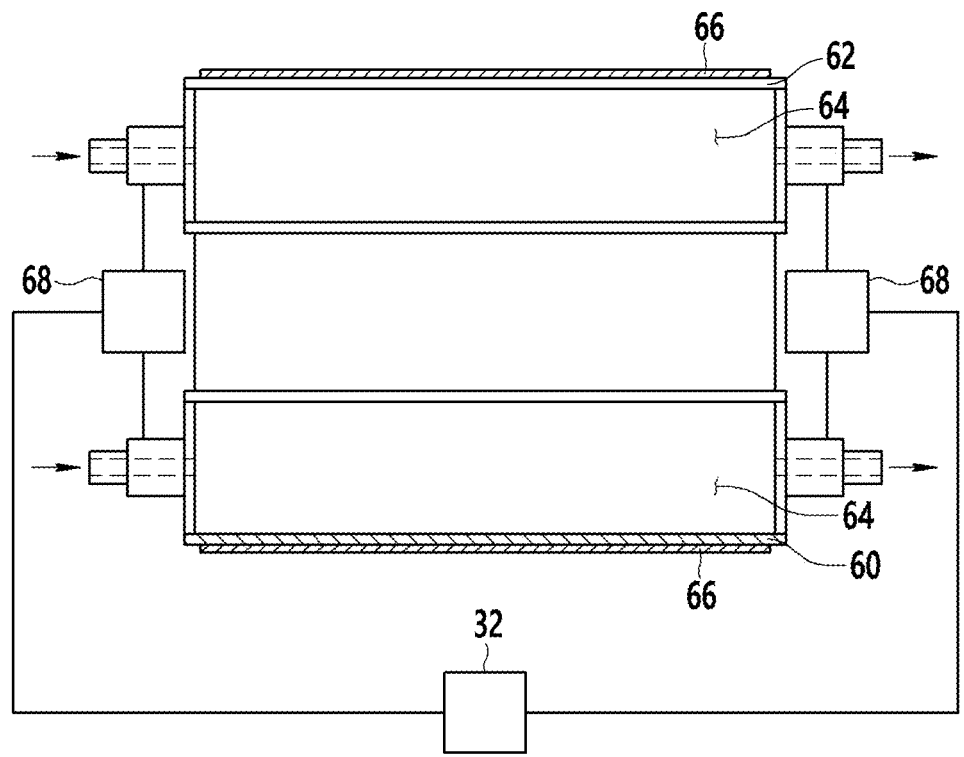

FIGS. 7 and 8 show the structure of the cooling part according to the present embodiment.

The cooling part may include at least one cooling body 60 cooling the plating layer closely adhering the plating layer on the surface of the steel sheet, and a coolant supplying part 50 supplying a cryogenic liquid including liquid nitrogen or liquid helium to the cooling body 60 to cool the cooling body 60.

In the present embodiment, the cooling body 60 may include a cooling roll 62 extending in the width direction of the steel sheet, including a cryogenic liquid circulated therein, and pressing the plating layer on the surface of the steel sheet P to apply cold air. The cold roll 62 may have a structure in which a plurality of cooling rolls 62 are disposed in multiple stages at intervals along the proceeding direction of the steel sheet.

The cooling roll 62 is a roll structure disposed in the width direction of the steel sheet like the chill roll 40. Both tops of the cooling roll 62 may be rotatably supported on a separate support (not shown) on the facility. The cooling roll 62 may be freely rotatable, and may be rotated together with the movement of the steel sheet, or may be connected to another driving source and rotated at a set speed.

The cooling roll 62 has a structure in which a cryogenic liquid is circulated inside and cooled to a low temperature.

Like the chill roll 40, the cooling roll 62 has a flow path 64 formed therein so that the cryogenic liquid passes therethrough. The flow path 64 formed inside the cooling roll 62 may be connected to the coolant supplying part (see 50 in FIG. 1) through both tops of the rotating shaft of the cooling roll 62. The cryogenic liquid supplied from the coolant supplying part 50 is circulated and supplied to the flow path 64 inside the cooling roll 62 through the top of the cooling roll 62. A surface of the cooling roll 62 is maintained in a low-temperature cooling state by the cryogenic liquid supplied into the cooling roll 62.

In addition, the cooling body 60 may further include a cooling belt 66 wound around at least two cooling rolls 62 and closely adhered with pressure to the plating layer on a surface of the steel sheet to apply cold air thereto. In this structure, the cooling belt 66 rather than the cooling roll 62, directly contacts the plating layer of the steel sheet.

The cooling roll 62 and the cooling belt 66 may be formed of a metal such as stainless steel, a ceramic, a ceramic coated metal material, or the like, having excellent cryogenic temperature durability so that they are stably usable for a long time in a cryogenic environment according to use of liquid nitrogen.

In the present embodiment, the cooling roll 62 or the cooling belt 66 in contact with the surface of the steel sheet may have an average surface roughness of 0.1 to 3 µm. If the surface roughness of the cooling roll 62 or the cooling belt 66 is higher than 3 µm, an uneven post-treatment problem occurs due to poor surface quality. If the surface roughness is lower than 0.1 µm, a problem that post-treatment characteristics such as chemical conversion treatment are deteriorated occurs.

In the present embodiment, the cooling belt 66 is wound around the two cooling rolls 62 to form one cooling body 60. One or a plurality of the cooling bodies 60 are arranged at intervals along the proceeding direction of the steel sheet. Each interval between the cooling bodies 60 and the number of the cooling bodies 60 may be variously changed according to facility or process conditions.

Each cooling body 60 may have the same structure, and a structure for one side cooling body is described below by way of example.

The cooling belt 66 is wound and installed between the two spaced apart cooling rolls 62, and the cooling belt 66 is in surface contact with the plating layer on the surface of the steel sheet. The cooling belt 66 may be rotated so as to meet the moving speed of the steel sheet, for example, by rotation driving of the cooling roll 62 in a state in contact with the steel sheet. The cooling belt 66 is rotated so as to meet the moving speed of the steel sheet, thereby minimizing friction between the steel sheet and the cooling belt 66 and preventing the plating layer from being damaged by friction.

The cooling roll 62 cools the cooling belt 66 provided at the outer side to a low temperature. The cooling belt 66 is in surface contact with the plating layer in a state of being cooled down to a low temperature by the cooling roll 62, and thus the plating layer may be rapidly cooled. In other words, the cooling belt 66 is in surface contact with the plating layer on the surface of the steel sheet between the two cooling rolls 62. Thus, a cooling area of the steel sheet with respect to the plating layer becomes larger by the contact area by the cooling belt 66. Accordingly, the cooling part of the present embodiment may increase the cooling rate by increasing the cooling area for the plating layer of the steel sheet through the cooling belt 66.

In the present embodiment, the cooling roll 62 may circulate the cryogenic liquid inside to cool the temperature of the cooling belt 66 in contact with the plating layer to −250 to 5° C. When the temperature of the cooling belt 66 is higher than 5° C., there is a problem that cooling performance and surface quality improving efficiency of the plated steel sheet are deteriorated. If the temperature of the cooling belt 66 is lower than −250° C., a low temperature brittle fracture problem of the cooing belt 66 occurs.

As described above, the cooling belt 66 installed on the cooling roll 62 is in contact with the plating layer to solidify the plating solution within a shorter period of time, and thus the plating apparatus of the present embodiment may quench the steel sheet to a temperature of 250° C. or less at a cooling rate of 20° C./sec through the cooling part.

The cooling part may adjust an interval between the two cooling rolls 62 constituting the unit to allow the cooling belt 66 to tense tightly. As the cooling belt 66 is tense and unfolded tightly, contact between the plating layer on the surface of the steel sheet and the cooling belt 66 is smooth and the plating layer may be cooled more evenly.

As shown in FIG. 8, to this end, the cooling part may be installed with a driving cylinder 68 stretching a space between the cooling rolls 62 between the two cooling rolls 62 around which the cooling belt 66 is wound. The driving cylinder 68 is driven according to a signal from the controlling part 32 to open the space between the cooling rolls 62. As the space between the cooling rolls 62 increases, the cooling belt 66 is unfolded tightly.

Further, the cooling roll 62 may precisely adjust the pressing force with respect to the plating layer of the steel sheet. To this end, the cooling roll 62 is not shown, but may include a load sensor, a controlling part, and a driving part in the same manner as the chill roll 40. The structure of adjusting the pressing force of the cooling roll is the same as the structure of the load sensor 30, the controlling part 32, and the driving part 34 with respect to the chill roll 40 described above, and thus detailed description of its structure and operation is omitted. Thus, the cooling roll is closely adhered by the pressure set on the steel sheet to precisely control the thickness of the plating layer of the steel sheet.

The cooling roll 62 is closer to the plating layer of the steel sheet or is spaced outwardly from the plating layer, and thus an interval between the cooling belt 66 wound around the cooling roll 62 and the steel sheet is changed to adjust the pressing force with respect to the plating layer of the steel sheet. Thus, the cooling part calculates a detection value of the load sensor 30 and moves the cooling roll 62 with respect to the steel sheet P, and thus it is possible to precisely control the plating layer pressing force by the cooling belt 66, thereby precisely controlling the thickness of the plating layer.

Here, the pressing force of the cooling belt 66 due to the movement of the cooling roll 62 may be the same or different for each of the plurality of cooling bodies 60 disposed along the moving direction of the steel sheet. That is, each cooling body 60 disposed along the moving direction of the steel sheet may be closely adhered to the steel sheet with the same pressing force. Otherwise, each cooling body 60 may be closely adhered to the steel sheet by gradually increasing the pressing force along the moving direction of the steel sheet. Accordingly, the steel sheet receives the gradually increasing pressing force passing through each cooling body 60, and thus the thickness of the plating layer may be gradually reduced.

Accordingly, the thickness of the plating layer may be more precisely controlled by pressing the plating layer of the steel sheet gradually from the knife 20 to the cooling roll 62 along the moving direction of the steel sheet.

Further, the cooling part is capable of improving the plating performance even with respect to a steel grade which is difficult to be plated by rapidly cooling the plating layer while pressurizing the plating layer under a predetermined pressure.

As described above, in the plating apparatus of the present embodiment, the cooling belt cooled by the cryogenic liquid is closely adhered to the plating layer and cooled, and thus the plating layer may be rapidly cooled as compared with the conventional plating apparatus. The cooling of the plated steel sheet directly affects surface quality of the product. If the non-solidified plating layer contacts a contaminated gas or a roll at the rear end of the facility, it cause a direct surface defect occurrence, and thus the plating layer should be completely solidified before entering the rear end of the facility. In the case of the conventional structure, since the gas or the water-cooling method is used, the cooling capacity is low due to low heat capacity. Thus, in order to cool the plated steel sheet to a predetermined temperature or less so as to completely solidify the plating layer, a very long multistage cooling line is required. Therefore, conventionally, since the cooling line is considerably complicated and the facility scale is enormous, it is difficult to effectively manage the facility, and surface defects frequently occur. Particularly, when a difference between a solidification start temperature and a solidification completion temperature of the plating layer is large like an alloy-plated steel sheet in which a large amount of Al and Mg is added to a Zn plating solution, a sufficient cooling effect may not be obtained by the conventional method using gas. As a result, the plating layer is not sufficiently cooled, and a coarse and vulnerable plating layer texture containing Al and Mg, which are strong oxidizing metals, is formed. In this region, surface defects of the plating layer such as black spots and black stains occur and cracking of the plating layer occurs, and corrosion resistance is deteriorated.

On the other hand, in the case of the present embodiment, the cooling belt 66 is in direct contact with the plating layer of the steel sheet to thereby cool the plating layer by using the cryogenic liquid, and thus the cooling efficiency is able to be further increased. Thus, the time required for cooling the plating layer may be significantly shortened. Therefore, according to the present embodiment, the cooling rate of the plated steel sheet is increased to 20° C./sec or more, and thus the facility line of the cooling part may be further reduced. Further, since gas is not in direct contact with the steel sheet, the occurrence of surface defects may be minimized, and a smaller and more even plating texture may be obtained to thereby manufacture a high-quality plated steel sheet. Further, since no cooling gas is used, occurrence of dust harmful to the environment may be prevented.

In addition, in the present embodiment, the cooling belt may be formed by stamping a pattern on the plating layer in a process of pressing and cooling the plating layer of the plated steel sheet. Here, the term "pattern" may mean repetitive symbols or patterns.

Since the plating layer of the plated steel sheet is influenced by the surface shape of the cooling belt in contact with the plating layer for cooling, the surface of the plating layer may be processed through a structure in which various patterns are formed on the cooling belt and transferred. To this end, the cooling belt may be formed with a pattern to be transferred to the plating layer on the surface thereof. Thus, in the process in which the cooling belt is closely adhered with pressure to the plating layer to cool the plating layer, the pattern formed on the surface of the cooling belt is pressed and transferred to the plating layer, and the pattern having the same pattern as the cooling belt is formed on the plating layer.

By rapidly cooling the plating layer by contacting the cooling belt with the plating layer of the plated steel sheet as described above, it is possible to easily form the pattern on the plating layer without using a separate apparatus for forming the pattern.

[Plated Steel Sheet Manufacturing Process]

Hereinafter, a process for manufacturing a plated steel sheet according to the present embodiment is described.

According to the present embodiment, a steel sheet plated with molten zinc through a plating bath is moved to an upper portion of the plating bath and is manufactured as a plated steel sheet through a process of adjusting the plating adhesion amount of the steel sheet and a process of cooling the steel sheet.

In order to adjust the plating adhesion amount of the steel sheet, the plating adhesion amount of the steel sheet drawn out from the plating bath is primarily controlled by the low temperature knife in contact with the plating layer on the surface of the steel sheet. In addition, the plating adhesion amount is controlled secondarily by the low temperature chill roll in contact with the plating layer on the surface of the steel sheet at the rear end of the knife.

The plating adhesion amount by the knife and chill roll may be precisely controlled by detecting the contact load of the knife and chill roll with respect to the steel sheet and controlling the pressing force by moving the knife and chill roll with respect to the steel sheet according to the detected contact load.

The knife and chill roll are supplied with the cryogenic liquid such as liquid nitrogen, or the like, and cooled to a low temperature. The tip part installed on the knife by the cryogenic liquid supplied to the knife is cooled to a temperature of 5° C. or less. Thus, the plating solution is not fused to the tip part cooled at a low temperature in a state in which the tip part contacts the plating layer to adjust the plating adhesion amount. Therefore, the knife may precisely control the plating adhesion amount of the plating layer in a state in which the tip part physically contacts the plating layer. As described above, the plating adhesion amount of the plating layer in the steel sheet drawn out from the plating bath is primarily controlled by the knife.

The chill roll is primarily contacted to the plating layer of the steel sheet of which the adhesion amount is controlled by the knife, and physically presses the plating layer, thereby more finely controlling the plating adhesion amount secondarily.

The chill roll is also cooled to a low temperature by the cryogenic liquid supplied to the inside, and thus the surface of the chill roll in contact with the plating layer is cooled to 5° C. DeletedTextsor less. Thus, the plating solution is not adhered to the surface of the chill roll in a state in which the chill roll presses the plating layer while being closely adhered thereto. Therefore, the chill roll may press the plating layer, and thus the plating adhesion amount of the plating layer may be precisely controlled.

In the process in which the steel sheet is pressed by the chill roll so that the plating adhesion amount is controlled, the plating layer of the steel sheet is rapidly cooled by the low temperature chill roll. The plating layer in contact with the chill roll is rapidly cooled by heat exchange with the chill roll in a state in which the chill roll is cooled by the cryogenic liquid as described above. Thus, the chill roll is in contact with the plating layer to cool the plating layer, and thus the plated steel sheet may be quenched at a cooling rate of 20° C./sec or more.

The rapidly cooled steel sheet passing through the chill roll is quenched below the set temperature as the steel sheet passes through a cooling section disposed at the rear end of the chill roll.

In the cooling section, a plurality of units including the cooling roll and the cooling belt as the cooling bodies are continuously disposed, and the cooling belt of each unit is closely adhered with pressure to the plating layer on the surface of the steel sheet.

The cooling roll is supplied with the cryogenic liquid such as liquid nitrogen, or the like, like the chill roll, and cooled to a low temperature. The cool air of the cooling roll is applied to the plating layer through the cooling belt to quench the plating layer.

The cooling belt is cooled to a low temperature by the cryogenic liquid, and thus the plating layer is not adhered to the cooling belt in a state in which the cooling belt presses the plating layer.

The cooling belt cools the plating layer while pressing the plating layer of the steel sheet with an appropriate pressure. The pressing force of the cooling belt with respect to the steel sheet may be precisely controlled by detecting a contact load of the cooling belt with respect to the steel sheet and moving the cooling belt with respect to the steel sheet according to the detected contact load.

Thus, the plated steel sheet passing through the chill roll is cooled by the cooling belt through the cooling section, and may be quenched to a temperature of 250° C. or less at a cooling rate of 20° C./sec or more.

Here, in the process of cooling the plating layer of the steel sheet by the cooling belt, a pattern may be formed on the surface of the plating layer of the plated steel sheet.

As the cooling belt pressurizes and cools the plating layer, the pattern formed on the surface of the cooling belt presses the plating layer. Thus, the pattern formed on the surface of the cooling belt is directly transferred to the plating layer to form the same pattern as the pattern formed on the surface of the cooling belt on the surface of the plating layer.

Thus, it is possible to form a desired pattern on the surface of the plated steel sheet in the process of simply cooling the plating layer.

As the chill roll and the cooling belt press the plating layer by direct contact through the process of controlling the plating adhesion amount and the process of cooling the plating layer, the thickness of the plating layer of the steel sheet is gradually decreased along the moving direction of the steel sheet, and thus the thickness of the plating layer of the steel sheet may be more precisely controlled.

In addition, since the cooling of the plating layer proceeds under the pressure by the chill roll and the cooling belt, a plating ability of the steel grade which is difficult to be plated may be improved.

The liquid nitrogen may be gasified during the process of adjusting the plating adhesion amount and the process of cooling the plating layer. The exhaust gas occurring in this process may be recycled as a reducing gas in a furnace or as a gas for maintaining an atmosphere in a cooling process of the plated steel plate after filtration.

As described above, the plated steel sheet of the present embodiment manufactured by rapid cooling may form a smaller and finer plating texture, and obtain excellent quality in view of corrosion resistance and crack resistance.

Hereinafter, the plated steel sheet according to the present embodiment is more specifically described.

The plated steel sheet of the present embodiment may include the plating layer including Zn on the steel sheet, and the Zn single-phase average particle size in the plating layer may be 5 μm or less.

In the present embodiment, the Zn single-phase average particle size in the plating layer may be more than 0 to 10 μm or less, more preferably more than 0 to 5 μm or less.

As described above, the crack resistance may be improved by forming the crystal grain finely with the Zn single-phase average particle size of 5 μm or less in the plating layer.

In the plated steel sheet of the present embodiment, the fraction of the Zn single-phase in the plating layer may be 15 to 40% by area.

If the fraction of the Zn single-phase is smaller than 15% by area, the possibility of coarsening of the two-way process texture is increased, and thus the quality may be deteriorated. If the fraction thereof is more than 40% by area, the effect of improving the plating characteristics of the steel sheet no longer appears.

The Zn single-phase may be formed with a uniform distribution in the plating layer.

In the plated steel sheet of the present embodiment, a size of a sequin of the plating layer may be 500 μm or less. Preferably, the size of the sequin of the plating layer may be more than 0 to 300 μm or less.

When the size of the sequins is more than 500 μm, there is a problem that cracks occur in the plating layer due to the coarse crystal grains.

In the plated steel sheet of the present embodiment, the plating layer containing Zn and Mg may be formed on the steel sheet, and a (112)/(201) ratio on $MgZn_2$ phase in the plating layer may be 0.6 or more.

When the (112)/(201) ratio on $MgZn_2$ phase in the plating layer is less than 0.6, there is a high possibility that cracks occur in the plating layer due to a high fraction of the vulnerable (201) phase, and the corrosion resistance after processing is adversely affected.

The plated steel sheet may be a plated steel sheet having a Zn—Al—Mg plating layer formed thereon.

To this end, the plated steel sheet of the present embodiment may be obtained by plating a heat-treated steel sheet through a plating bath including 0.1 to 7 wt % of Mg, 1 to 9 wt % of Al, and the balance of Zn. The plated steel sheet may be plated with the plating adhesion amount of 30 to 400 g/m² through the plating bath.

In the plated steel sheet, a hot-rolled steel sheet or a cold-rolled steel sheet may be used as a base steel sheet.

The thickness of the plating layer in the present embodiment may be 5 to 50 μm.

Further, in the plated steel sheet of the present embodiment, the distribution of the Zn single-phase in the plating layer may be even throughout a thickness direction of the plating layer.

In the conventional case, the faster the cooling rate is, the more the distribution ratio of the Zn single-phase on the surface of the plating layer tends to increase. On the other hand, in the plated steel sheet of the present embodiment, the plating layer is rapidly cooled, and thus the Zn single-phase is evenly distributed generally from the interface with the steel sheet to an outer surface along the thickness direction of the plating layer.

In the plated steel sheet of the present embodiment, a Zn single-phase distribution B/A with respect to the thickness direction of the plating layer may be 0.5 to 1.0. Here, A is a fraction of the entire Zn single-phase with respect to the thickness direction of the plating layer, and B is a fraction of the Zn single-phase in an outer surface layer portion of the plating layer. Further, the surface layer portion may mean a region within about ½ the entire thickness of the plating layer on the outer surface of the plating layer along the thickness direction of the plating layer.

When the value of B/A is less than 0.5, it means that the Zn single-phase distribution in the surface layer portion as compared to the entire is extremely small, and thus a generally uneven distribution is shown, and when the value of B/A is more than 1.0, on the contrary, it means that the Zn single-phase distribution in the surface layer portion as compared to the entire is extremely large, the generally uneven distribution is also shown. When the B/A value is out of the above-described range, and the uneven distribution is shown, the crack resistance of the plating layer is lowered.

The plated steel sheet of the present embodiment has a predetermined form of a contact-type pressure cooling pattern formed on the surface of the plating layer.

The pattern may be formed by transferring the surface pattern of the cooling belt which is closely adhered with pressure to the plating layer and applies cool air thereto in order to rapidly cool the plating layer of the plated steel sheet.

EXPERIMENTAL EXAMPLE 1

With respect to general GI plating and plating using Zn (zinc), Al (aluminum), Mg (magnesium) (hereinafter referred to as PosMAC plating), plating layers were formed by a conventional cooling method and a cooling method according to the present embodiment, thereby manufacturing plated steel sheets, and textures were compared with each other.

Here, the general GI plated steel sheet is a steel sheet including a plating layer with a plating solution containing zinc. The PosMAC plating is a steel sheet including a plating layer with a plating solution containing magnesium, aluminum and zinc, and for example, a plated steel sheet including a Zn—Al—Mg plating layer formed by plating with a plating solution containing 1 to 4 wt % of Al, 1 to 4 wt % of Mg, the balance of Zn, and 0.1 wt % or less of impurities.

Figure 9:
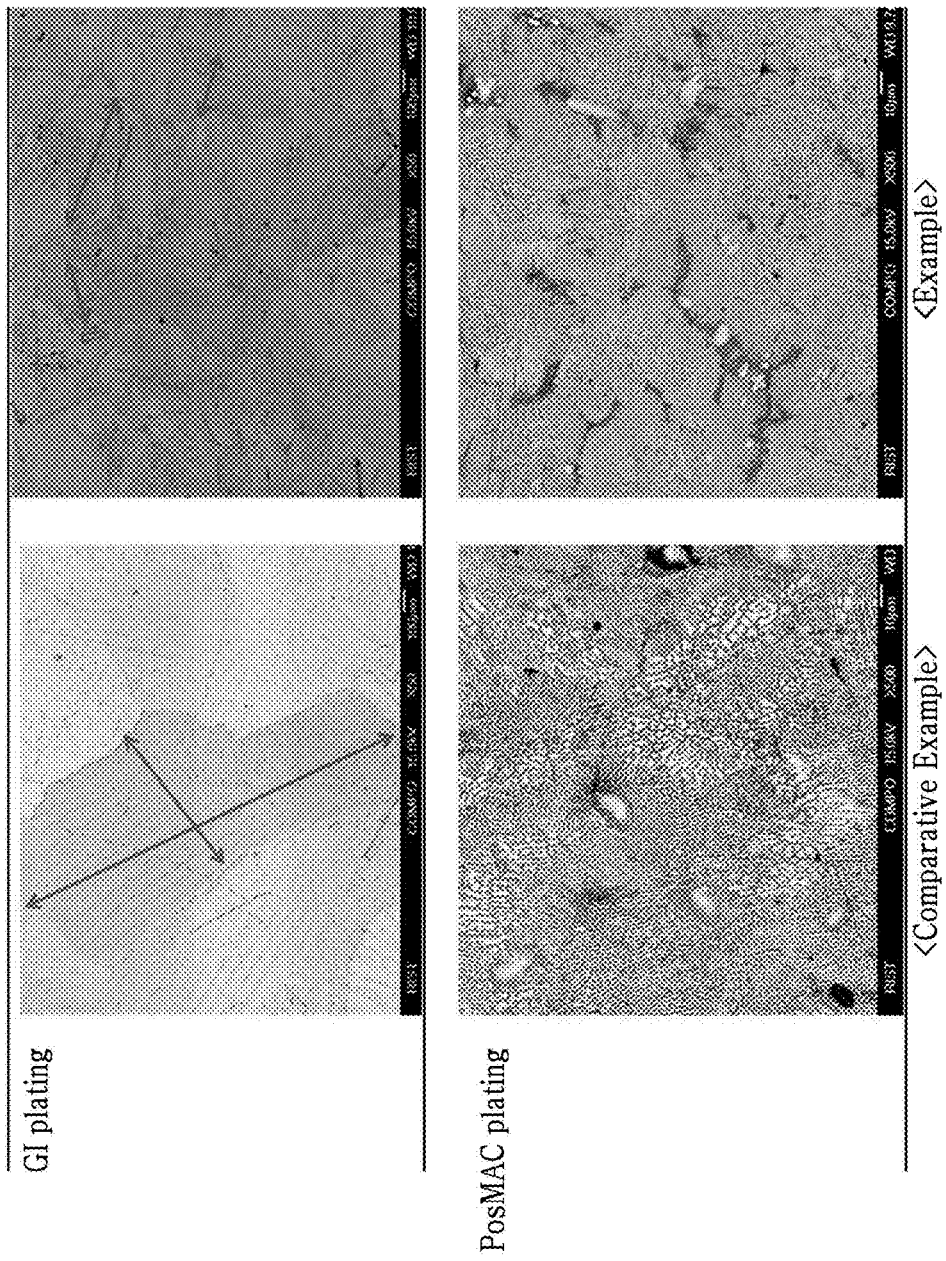
FIGS. 9 and 10 are electron microscope images showing a plating layer texture on a surface of the plated steel sheet manufactured according to the present embodiment in comparison with the related art.

In FIG. 9, Example shows plating textures of the plating layers with respect to the GI-plated steel sheet and the PosMAC-plated steel sheet manufactured by quenching at a cooling rate of 20° C./sec or more according to the present invention. Comparative Example shows plating textures of the plating layers with respect to the GI-plated steel sheet and the PosMAC-plated steel sheet manufactured by slowly cooling at a cooling rate of 10° C./sec or less according to the cooling method by the conventional gas.

As shown in FIG. 9, it could be confirmed that in the case of the general GI-plated steel sheet, Comparative Example had the coarse size of the sequin as large as 800 to 2,000 μm, whereas Example had the fine plating texture, and the size of the sequin was 300 to 500 μm, and thus the crystal grain was very fine.

Further, even in the PosMAC-plated steel sheet, it could be confirmed that the Zn single-phase and the MgZn₂ texture of the plating layers were fine in Example as compared to Comparative Example.

Figure 10:
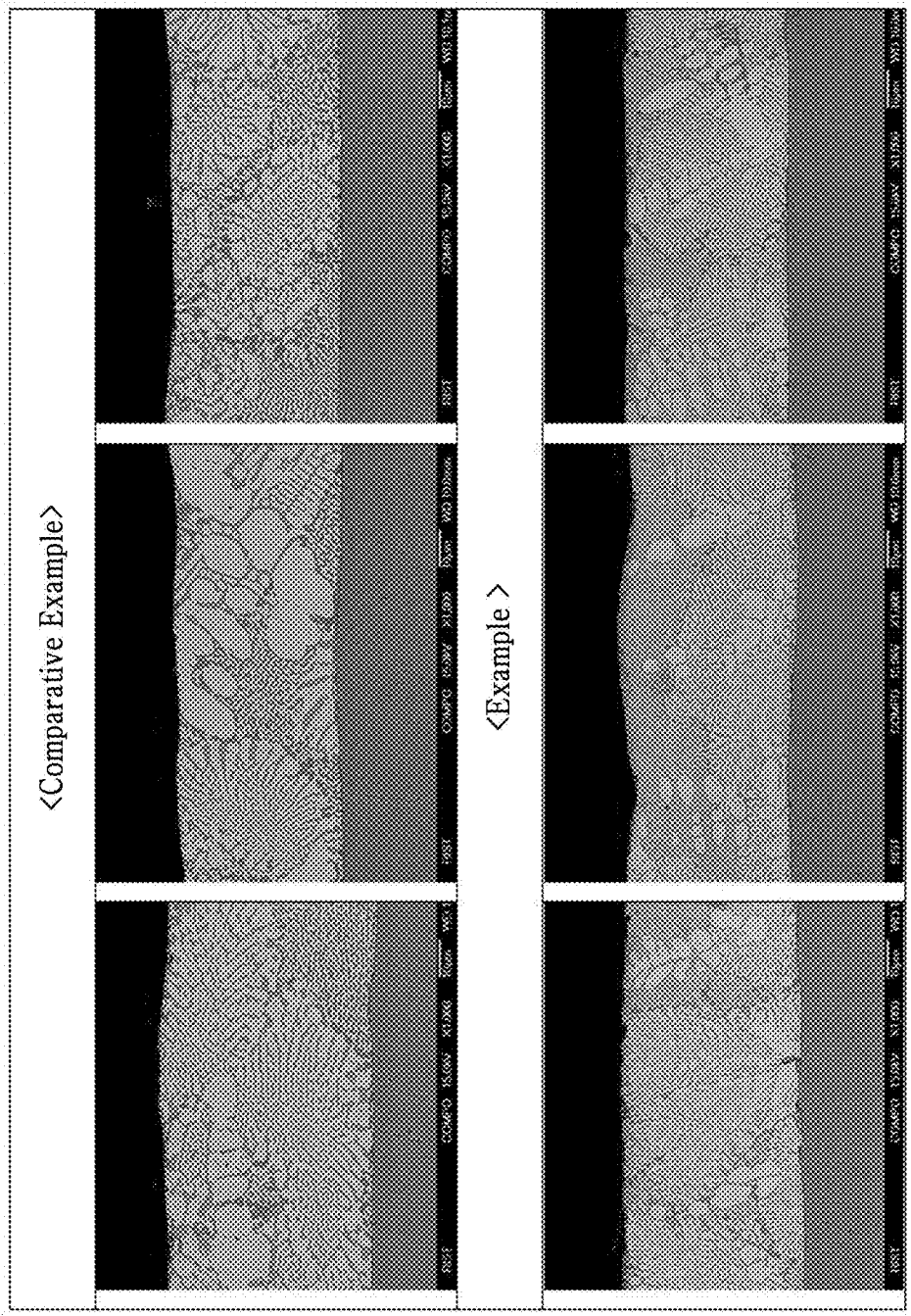

FIG. 10 shows the cross-sectional texture of the plating layer with respect to the PosMAC-plated steel sheet. Comparative Example shows the plating layer of the steel sheet manufactured according to a conventional cooling method, and Example shows the plating layer of the steel sheet manufactured by quenching according to the present invention. As shown in FIG. 10, it could be confirmed that the Zn single-phase and the MgZn₂ texture of the plating layers were fine in Example as compared to Comparative Example.

Thus, when the plated steel sheet is manufactured through the quenching process as in the present Example, the texture of the plating layer is able to be finer.

It could be appreciated that in the Example, the average particle size of the Zn single-phase was also fine and even distribution was shown without deviation as compared to Comparative Example. The fraction of Zn single-phase was determined by calculating a surface fraction of the Zn single-phase through an image analyzer from an image of the cross-sectional texture of the plating layer observed using an optical microscope as shown in FIG. 10. An area fraction of the Zn single-phase was measured by dividing the area of the entire plating layer and averaging the area.

It could be confirmed that in Comparative Example, the Zn single-phase average particle size was coarse, the Zn single-phase fraction value was low, and the deviation for each position was large. On the other hand, it could be confirmed that in the present Example, the average particle size of the Zn single-phase in the plating layer was fine to be 5 μm or less, the fraction of the Zn single-phase was also high as compared with Comparative Example, and even distribution was shown without deviation.

TABLE 1

| Plating layer | Texture 1(%) | Texture 2(%) | Texture 3(%) |
|---|---|---|---|
| Zn single-phase fraction (A) with respect to the entire thickness direction | 32.26 | 23.3 | 20.9 |
| Zn single-phase fraction (B) with respect to surface layer portion | 31.9 | 16.58 | 13.63 |
| B/A | 0.99 | 0.71 | 0.65 |

Table 1 shows the Zn single-phase distribution B/A with respect to the thickness direction of the plating layer of the plated steel sheet of the present embodiment shown in FIG. 10. In FIG. 10, respective images in the direction from the left to the right are referred to texture 1, texture 2, and texture 3. The surface layer portion was set as a region from the surface of the plating layer to the point of about ½ of the thickness of the plating layer along the thickness direction of the plating layer, and the B value, which is the Zn single-phase fraction in the corresponding area, was obtained.

As shown in Table 1, it could be confirmed that by increasing the cooling rate of the plated steel sheet according to the present embodiment, the value of B/A was 0.5 or more to 1.0 or less, and the plating layer was evenly distributed throughout the thickness direction of the plating layer.

On the other hand, in Comparative Example of FIG. 10, the coarse Zn single-phase was generated unevenly, and if the cooling rate increased, as the cooling rate was faster, the distribution ratio of the Zn single-phase on the surface of the plating layer tended to increase.

FIG. 11 shows the cross-sectional texture of the plating layer when cooling by increasing the cooling rate with respect to Comparative Example.

In FIG. 11, the experiment was performed by manufacturing the plated steel sheet by applying the conventional cooling method by gas to perform the cooling, and changing the cooling rate, and measuring the cross-sectional texture of the plating layer.

As shown in FIG. 11, it could be confirmed that in the case of the conventional plated steel sheet, the Zn single-phase area existing in the surface layer portion of the plating layer increased as the cooling rate increased. As a result of the salt spray test, the slower the cooling rate, the better the corrosion resistance, which is presumed since the Zn phase of the plating layer, which is vulnerable to corrosion resistance, is present in a small amount on the surface layer of the plating layer.

As described above, in Comparative Example, the cooling was performed by the conventional cooling method using gas, and thus even if the cooling rate increased, it was difficult for the Zn single-phase to be evenly distributed generally from the interface with the steel sheet to the outer surface along the thickness direction of the plating layer as in the present embodiment.

EXPERIMENTAL EXAMPLE 2

The characteristics of the plating layer were compared with respect to the PosMAC-plated steel sheets manufactured by Comparative Examples manufactured by the conventional slowly cooling method using gas and Examples manufactured by quenching according to the present invention.

Figure 12:
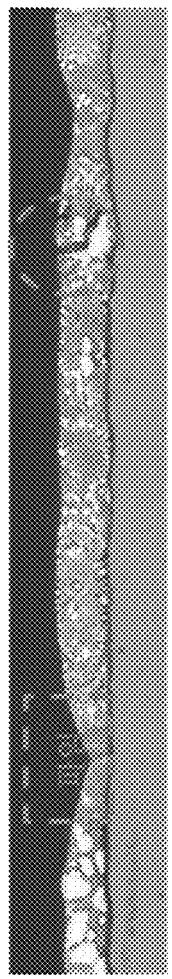
FIG. 12 is a chart showing plating layer characteristics of the plated steel sheet manufactured according to the present embodiment in comparison with the related art.
Figure 13:
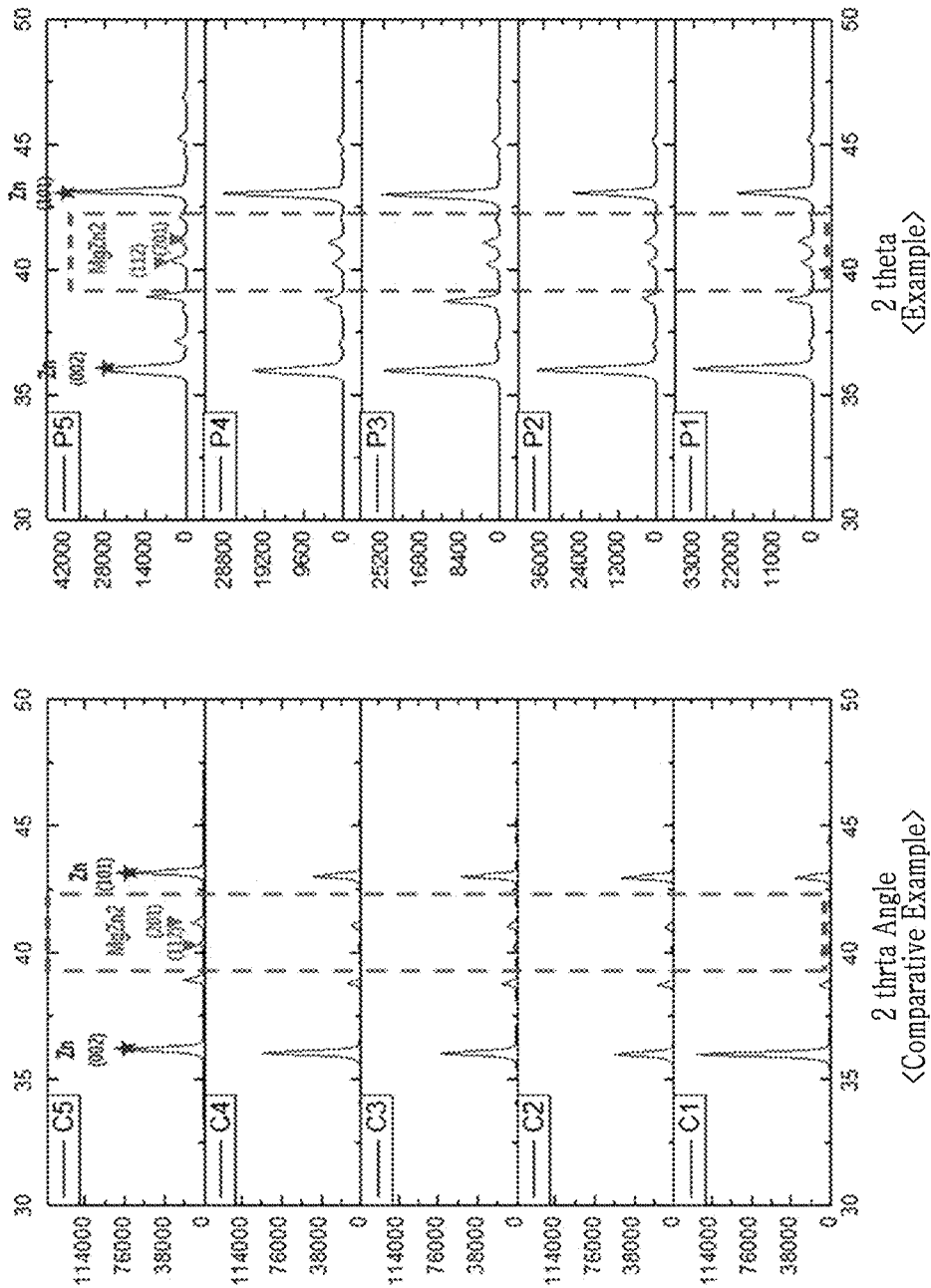
FIG. 13 is a view showing changes in crystal structures of the plating layers with respect to Comparative Examples and Examples of FIG. 12 according to the present embodiment, using an X-ray diffraction tester.
Figure 14:
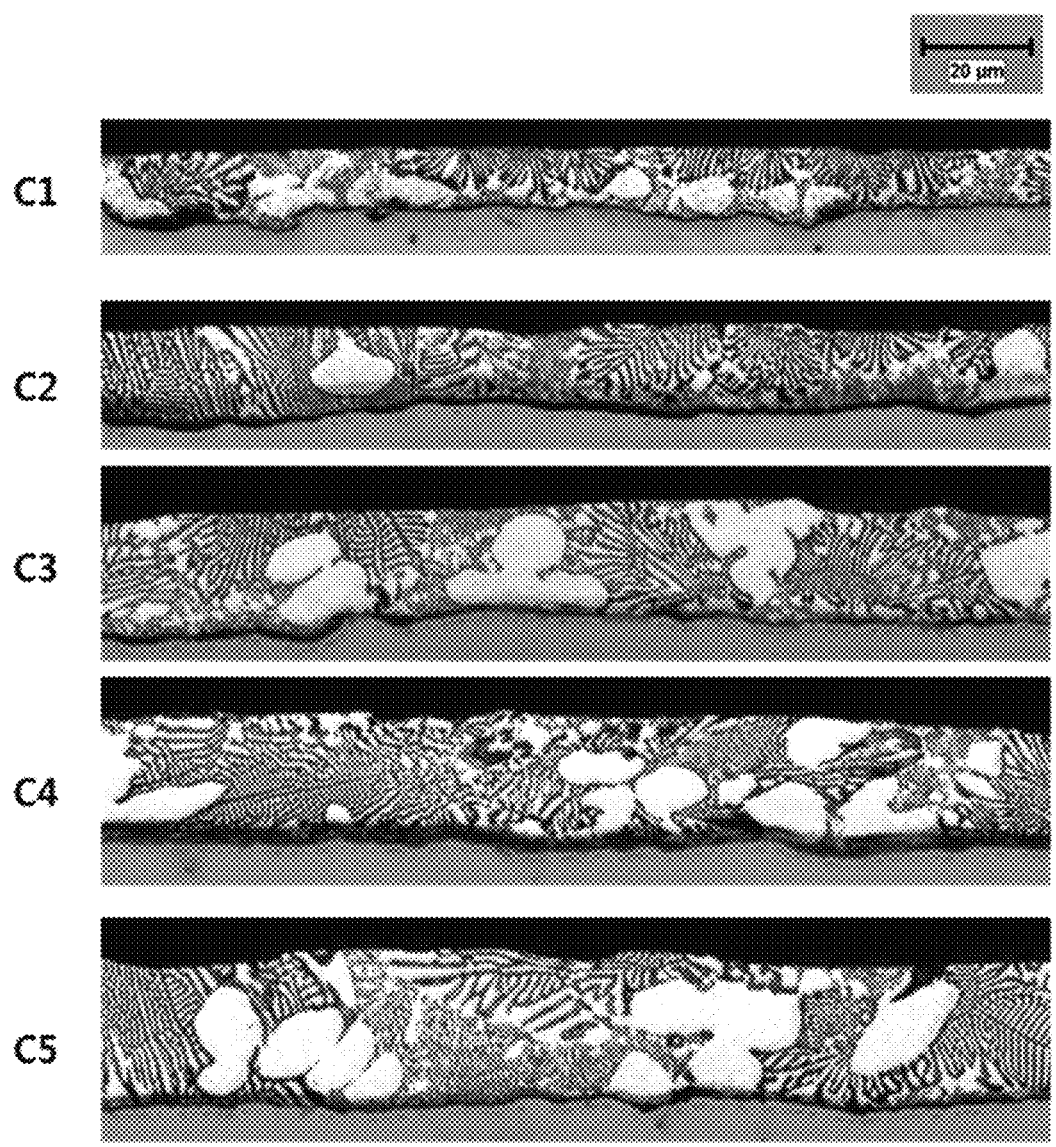
FIGS. 14 and 15 are electron microscope images showing cross-sectional textures of the plating layers with respect to Comparative Examples and Examples of FIG. 11 according to the present embodiment.
Figure 15:
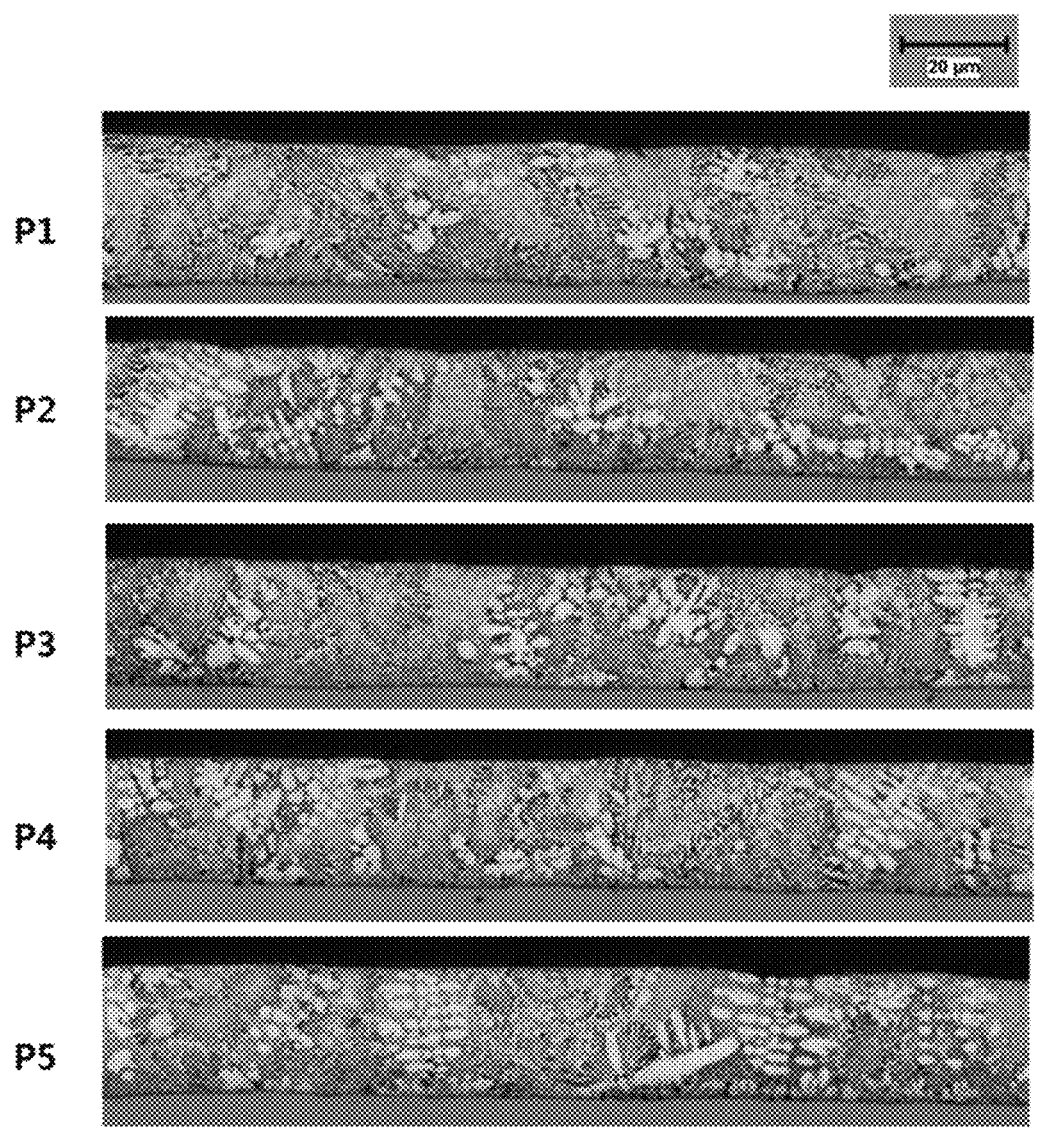

FIG. 12 is a chart showing plating layer characteristics with respect to Comparative Examples and Examples under various conditions, and FIG. 13 shows changes in crystal structures of the plating layers with respect to Comparative Examples and Examples of FIG. 12, respectively, using an X-ray diffraction tester. Further, FIGS. 14 and 15 show the cross-sectional textures of the plating layers with respect to Comparative Examples and Examples, respectively.

Comparative Examples and Examples are all plated steel sheets having a thickness of 1.5 mm including the plating layer of the same component, wherein Examples were merely manufactured by quenching at a cooling rate of 20° C./sec or more according to the present invention, and Comparative Examples were manufactured by slow cooling at a cooling rate of 10° C./sec or less according to the conventional cooling method using gas.

As shown in FIG. 12, in Comparative Examples, defects such as cracks, pitting, or the like, frequently occurred in the plating layer, whereas in Examples, no plating layer defects occurred at all. Here, the plating layer defects refer to cracks or pitting, as shown in FIG. 12, and the occurrence frequency of plating defects means the number of cracks or pitting occurring in a region within about 10 mm in length of the plating layer.

As shown in FIGS. 12 to 15, in Comparative Examples, the plating layer texture had a small area fraction of the Zn single-phase but the coarse particle size of 5 µm or more, and the occurrence frequency of plating defects increased with an increase in the plating amount. In addition, it could be appreciated that the Zn single-phase fraction was low and the deviation of the microstructure for each position was large.

On the other hand, in the case of the plated steel sheet manufactured according to the present embodiment, considering that the experiment is a batch-type in which the average particle size of the Zn single-phase in the plating layer texture was 3 µm or less, it could be appreciated that the crystal grain could be finely formed to have the average particle size of 5 µm or less, the $MgZn_2$ texture was fine, and there were no defects such as cracks, pitting, or the like, in the plating layer. Further, unlike Comparative Example, it could be appreciated that the fraction of Zn single-phase was high, and even plating texture was shown without deviation for each position.

As described above, it could be confirmed that in Comparative Example, the Zn single-phase average particle size in the cross-sectional texture of the plating layer was very large, whereas in Example, the Zn single-phase average particle size in the cross-sectional texture of the plating layer was 5 µm or less, and thus the plated steel sheet was formed to be very fine and even. Therefore, it could be appreciated that the plated steel sheet according to the present Example was a plated steel material in which the Zn single-phase had a fine average particle size of 5 µm or less, and evenly formed in the entire thickness direction of the plating layer, thereby having excellent crack resistance.

Further, in Comparative Examples, since the cooling effect of the plating layer was poor, the $MgZn_2$ (201) phase, which was vulnerable and coarse, was largely generated. Thus, in all of Comparative Examples, the fractions of the vulnerable (201) phases were high, and thus the (112)/(201) ratio on the $MgZn_2$ phase was low as 0.4 or less. The plating layer texture was highly likely to cause cracks in the plating layer, and adversely affected securing of corrosion resistance after processing.

On the other hand, Examples were manufactured by rapid cooling, and thus the $MgZn_2$ texture was fine and the (112)/(201) ratio on $MgZn_2$ phase was 0.7 or more. Considering that the experiment was a batch-type, it could be appreciated that in the present Example, the (112)/(201) ratio on the $MgZn_2$ phase increased from 0.6 or more to 5 or less.

Therefore, an excellent plating layer texture could be obtained by applying the new rapid cooling process to form the plating layer texture to be fine and to suppress the occurrence of cracks in the plating layer, and by increasing the (112)/(201) ratio on the $MgZn_2$ phase in the plating layer to 0.6 or more.

As shown in FIG. 15, the distribution of the Zn single-phase in the plating layer is even throughout the thickness direction of the plating layer by increasing the cooling rate in the plated steel sheet of the present embodiment.

However, as described above, in Comparative Example, if the cooling rate increased, as the cooling rate was faster, the distribution ratio of the Zn single-phase on the surface of the plating layer tended to increase.

EXPERIMENTAL EXAMPLE 3

Figure 16:
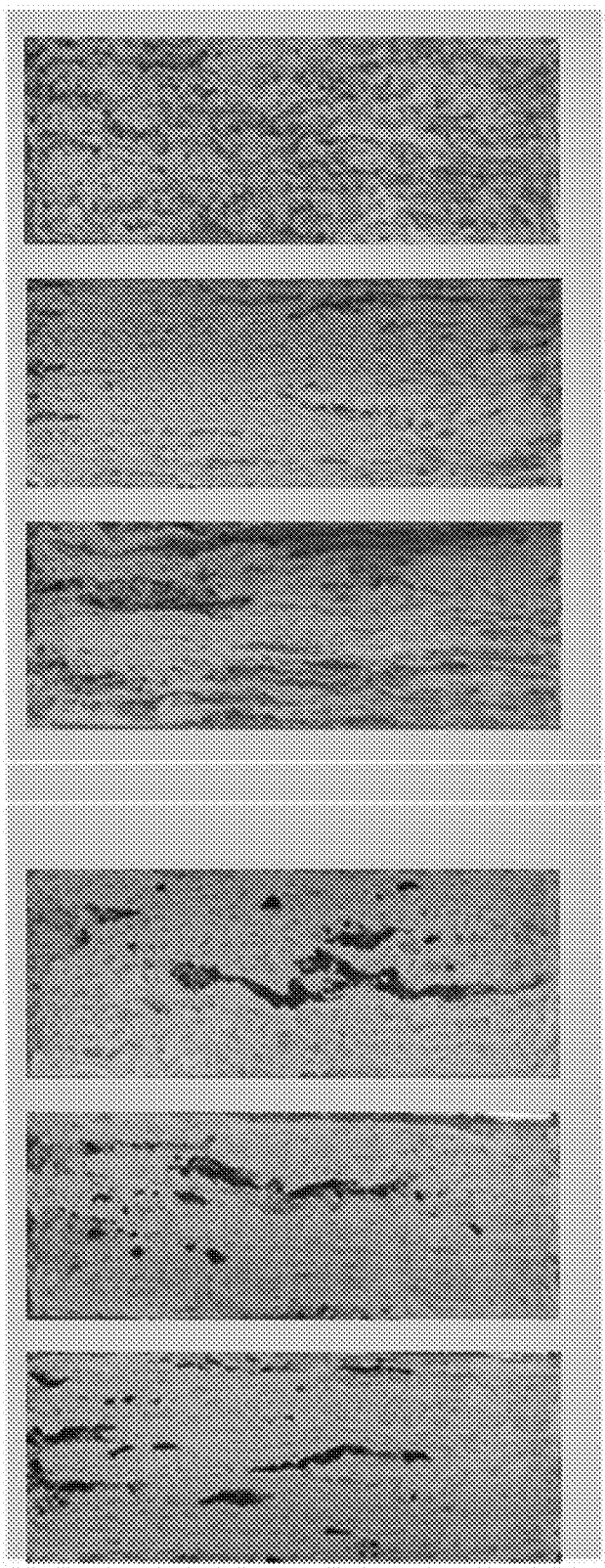
FIG. 16 shows corrosion resistance test results of the plated steel sheet according to the present embodiment in comparison with the related art.

FIG. 16 shows corrosion resistance test results on the PosMAC-plated steel sheets manufactured by Comparative Examples manufactured by the conventional slowly cooling method using gas and Examples manufactured by quenching according to the present invention.

FIG. 16 shows results of 800 hours after a salt spray test (SST) was performed on the Comparative Example and the Example. As shown in FIG. 16, it could be confirmed that the Example had excellent corrosion resistance as compared to the Comparative Example.

EXPERIMENTAL EXAMPLE 4

FIG. 17 shows plated steel sheets of various embodiments having the predetermined form of the contact-type pressure cooling pattern formed on the surface of the plating layer.

FIG. 17 shows various examples of patterns formed on the plating layer of the plated steel sheet. As shown in FIG. 17, the pattern may be formed in various forms such as a woven cloth shape, a polygonal shape such as a net shape, an irregular closed curved shape, etc. The pattern with respect to the plating layer is not limited thereto and may be variously modified.

In the present experiment, the pattern was previously formed on the surface of the cooling belt rapidly cooling the plated steel sheet during the process of manufacturing the plated steel sheet, and the plated steel sheet was cooled by contacting the cooling belt to the plated steel sheet with pressure, thereby forming the contact-type pressure cooling pattern on the plating layer.

As a result of the experiment, as shown in FIG. 17, it was confirmed that the pattern formed on the cooling belt was transferred to the plating layer of the plated steel sheet to manufacture the plated steel sheet having a desired pattern.

While the illustrative embodiments of the present invention have been shown as described above, various modifications and alternative embodiments may be made by those skilled in the art. These modifications and alternative embodiments will be considered and included in the appended claims so as not to depart from the true spirit and scope of the present invention.

The invention claimed is:

1. A plated steel sheet having a fine and even plating texture, the plated steel sheet comprising:
a Zn-based plating layer formed on a steel sheet,
wherein the Zn-based plating layer includes a Zn single-phase texture having an average particle size of 5 µm or less; and
a Zn single-phase distribution B/A in the plating layer satisfies a condition of being 0.5 to 1.0, and thus the Zn single-phase is formed having an even distribution with respect to a thickness direction of the plating layer,
wherein A is a fraction of the entire Zn single-phase with respect to the thickness direction of the plating layer and B is a fraction of the Zn single-phase in an outer surface layer portion of the plating layer, the surface layer portion being defined by a region from an outer surface of the plating layer to a centerpoint of the plating layer in the thickness direction of the plating layer, and
wherein A is 15 to 40% by area.

2. The plated steel sheet of claim 1, wherein:
a size of a sequin of the plating layer is 300 to 500 µm.
3. The plated steel sheet of claim 1, wherein:
the plating layer has a contact-type pressure cooling pattern on a surface thereof.
4. The plated steel sheet of claim 3, wherein:
the contact-type pressure cooling pattern is in the form of a woven cloth, a net, or an irregularly intertwined line.
5. The plated steel sheet of claim 1, wherein:
the plating layer further includes a Mg component, and the plating layer includes a $MgZn_2$ phase.
6. The plated steel sheet of claim 5, wherein:
a (112)/(201) ratio on the $MgZn_2$ phase is 0.6 or more.
7. The plated steel sheet of claim 6, wherein:
the plating layer is a Zn—Al—Mg alloy plating layer further including an Al component.
8. The plated steel sheet of claim 6, wherein:
a thickness of the plating layer is 5 to 50 µm.
9. A plated steel sheet having a fine and even plating texture, the plated steel sheet comprising:
a Zn-based plating layer formed on a steel sheet,
wherein the Zn-based plating layer includes a Zn single-phase texture having an average particle size of 5 µm or less; and
a Zn single-phase distribution B/A in the plating layer satisfies a condition of being 0.5 to 1.0, and thus the Zn single-phase is formed having an even distribution with respect to a thickness direction of the plating layer,
wherein A is a fraction of the entire Zn single-phase with respect to the thickness direction of the plating layer and B is a fraction of the Zn single-phase in an outer surface layer portion of the plating layer, the surface layer portion being defined by a region from an outer surface of the plating layer to a centerpoint of an entire thickness of the plating layer in the thickness direction of the plating layer,
wherein the plating layer has a pattern on a surface thereof, and
wherein the pattern is in the form of a woven cloth, a net, or an irregularly intertwined line.
10. A plated steel sheet having a fine and even plating texture, the plated steel sheet comprising:
a Zn-based plating layer formed on a steel sheet,
wherein the Zn-based plating layer includes a Zn single-phase texture having an average particle size of 5 µm or less; and
a Zn single-phase distribution B/A in the plating layer satisfies a condition of being 0.5 to 1.0, and thus the Zn single-phase is formed having an even distribution with respect to a thickness direction of the plating layer,
wherein A is a fraction of the entire Zn single-phase with respect to the thickness direction of the plating layer and B is a fraction of the Zn single-phase in an outer surface layer portion of the plating layer, the surface layer portion being defined by a region from an outer surface of the plating layer to a centerpoint of an entire thickness of the plating layer in the thickness direction of the plating layer, and
wherein the plating layer further includes a Mg component, and the plating layer includes a $MgZn_2$ phase.
11. The plated steel sheet of claim 10, wherein:
a (112)/(201) ratio on the $MgZn_2$ phase is 0.6 or more.
12. The plated steel sheet of claim 11, wherein:
the plating layer is a Zn—Al—Mg alloy plating layer further including an Al component.
13. The plated steel sheet of claim 11, wherein:
a thickness of the plating layer is 5 to 50 µm.

* * * * *